US012593336B2

(12) United States Patent
Liu

(10) Patent No.: US 12,593,336 B2
(45) Date of Patent: Mar. 31, 2026

(54) PUCCH RESOURCE INDICATION METHOD, COMMUNICATION DEVICE AND STORAGE MEDIUM

(71) Applicant: Beijing Xiaomi Mobile Software Co., Ltd., Beijing (CN)

(72) Inventor: Yang Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 389 days.

(21) Appl. No.: 18/260,699

(22) PCT Filed: Jan. 14, 2021

(86) PCT No.: PCT/CN2021/071879
§ 371 (c)(1),
(2) Date: Jul. 7, 2023

(87) PCT Pub. No.: WO2022/151228
PCT Pub. Date: Jul. 21, 2022

(65) Prior Publication Data
US 2024/0057089 A1 Feb. 15, 2024

(51) Int. Cl.
| | |
|---|---|
| *H04W 72/21* | (2023.01) |
| *H04L 5/00* | (2006.01) |
| *H04W 72/04* | (2023.01) |
| *H04W 72/232* | (2023.01) |

(52) U.S. Cl.
CPC ........... *H04W 72/21* (2023.01); *H04L 5/0035* (2013.01); *H04W 72/232* (2023.01); *H04W 72/04* (2013.01)

(58) Field of Classification Search
CPC ... H04W 72/21; H04W 72/232; H04W 72/04; H04L 5/0035; H04L 5/0053; H04L 5/0094
See application file for complete search history.

(56) References Cited

U.S. PATENT DOCUMENTS

| | | | | |
|---|---|---|---|---|
| 10,959,250 B2 * | 3/2021 | Yang | .................... | H04L 5/0053 |
| 11,343,652 B2 * | 5/2022 | Takeda | .................. | H04L 1/1825 |
| 11,729,800 B2 * | 8/2023 | Xu | ......................... | H04L 5/0055 |
| | | | | 370/329 |

(Continued)

FOREIGN PATENT DOCUMENTS

| | | |
|---|---|---|
| CN | 110535608 A | 12/2019 |
| CN | 110798894 A | 2/2020 |

(Continued)

OTHER PUBLICATIONS

"Enhancements on Multi-TRP for reliability and robustness in Rel-17," Proceedings of the 3GPP TSG RAN WG1 Meeting #102-e, R1-2006391, Huawei, HiSilicon, Aug. 17, 2020, E-Meeting, 7 pages.

(Continued)

*Primary Examiner* — Phirin Sam
*Assistant Examiner* — Tarell A Hampton
(74) *Attorney, Agent, or Firm* — McCoy Russell LLP

(57) ABSTRACT
A PUCCH resource indication method includes: obtaining a target PUCCH resource which is indicated for a UE and can support joint transmission to multiple TRPs of a base station, and repeatedly transmitting UCI to the multiple TRPs of the base station in one time slot or among multiple time slots by using the target PUCCH resource.

16 Claims, 12 Drawing Sheets

(56) References Cited

U.S. PATENT DOCUMENTS

| | | | | |
|---|---|---|---|---|
| 11,974,229 | B2 * | 4/2024 | Matsumura | H04W 52/146 |
| 12,149,955 | B2 * | 11/2024 | Kang | H04L 5/0023 |
| 12,376,111 | B2 * | 7/2025 | Jung | H04W 72/542 |
| 2013/0170480 | A1 | 7/2013 | Novak et al. | |
| 2018/0220415 | A1 * | 8/2018 | Yin | H04L 5/0094 |
| 2019/0253200 | A1 * | 8/2019 | Salem | H04W 74/0808 |
| 2020/0178240 | A1 | 6/2020 | Zhang et al. | |
| 2020/0205149 | A1 * | 6/2020 | Khoshnevisan | H04L 1/1861 |
| 2020/0205150 | A1 | 6/2020 | Cheng et al. | |
| 2020/0328849 | A1 * | 10/2020 | Noh | H04L 1/1812 |
| 2021/0050968 | A1 * | 2/2021 | Yi | H04L 5/0051 |
| 2021/0136749 | A1 * | 5/2021 | Matsumura | H04W 72/02 |
| 2021/0352629 | A1 * | 11/2021 | Haghighat | H04L 1/1896 |
| 2021/0368496 | A1 * | 11/2021 | Li | H04W 72/0446 |
| 2021/0391955 | A1 * | 12/2021 | He | H04L 5/0053 |
| 2021/0392673 | A1 * | 12/2021 | Miao | H04W 80/02 |
| 2022/0030443 | A1 * | 1/2022 | Chen | H04W 72/21 |
| 2022/0150926 | A1 * | 5/2022 | Mondal | H04W 72/02 |
| 2022/0201619 | A1 * | 6/2022 | Yao | H04W 52/146 |
| 2022/0217754 | A1 * | 7/2022 | Matsumura | H04L 5/0035 |
| 2022/0279538 | A1 * | 9/2022 | Jung | H04W 72/1268 |
| 2022/0321305 | A1 * | 10/2022 | Xiao | H04L 5/0078 |

FOREIGN PATENT DOCUMENTS

| | | | |
|---|---|---|---|
| CN | 111092697 A | 5/2020 | |
| CN | 111436083 A | 7/2020 | |
| CN | 111988857 A | 11/2020 | |
| CN | 114930944 A | * | 8/2022 | H04L 1/1896 |
| KR | 20200040223 A | * | 4/2020 | H04L 5/0053 |
| WO | WO-2017173879 A1 | * | 10/2017 | H04W 72/23 |
| WO | 2020143801 A1 | | 7/2020 | |
| WO | WO-2020143766 A1 | * | 7/2020 | H04W 72/27 |
| WO | WO-2020215228 A1 | * | 10/2020 | H04W 72/21 |
| WO | 2020220330 A1 | | 11/2020 | |
| WO | 2020227138 A1 | | 11/2020 | |
| WO | WO-2021018185 A1 | * | 2/2021 | H04W 72/0446 |
| WO | WO-2021142802 A1 | * | 7/2021 | H04W 72/21 |

OTHER PUBLICATIONS

"Enhancements on Multi-TRP for PDCCH, PUCCH and PUSCH," Proceedings of the 3GPP TSG RAN WG1 Meeting #102-e, R1-2006543, Xiaomi, Aug. 17, 2020, E-Meeting, 4 pages.
"Multi-TRP/panel for non-PDSCH," Proceedings of the 3GPP TSG RAN WG1 #103-e, R1-2007540, Futurewei, Oct. 26, 2020, E-Meeting, 19 pages.
"Enhancements on Multi-TRP and Multi-panel Transmission," Proceedings of the 3GPP TSG RAN WG1 #98bis, ZTE, R1-1910284, Oct. 14, 2019, Chongqing, China, 16 pages.
Jiao, H. et al., "The Enhanced Technology and Development Trend of Massive MIMO in 5G," China Academic Journal Electronic Publishing House, Mobile Communications, vol. 5, Apr. 23, 2020, 5 pages. (Submitted with English Abstract).
"On PDCCH, PUCCH and PUSCH enhancements with multiple TRPs," Proceedings of the 3GPP TSG-RAN WG1 Meeting #103, Ericsson, R1-2009223, Oct. 26, 2020, eMeeting, 25 pages.

* cited by examiner

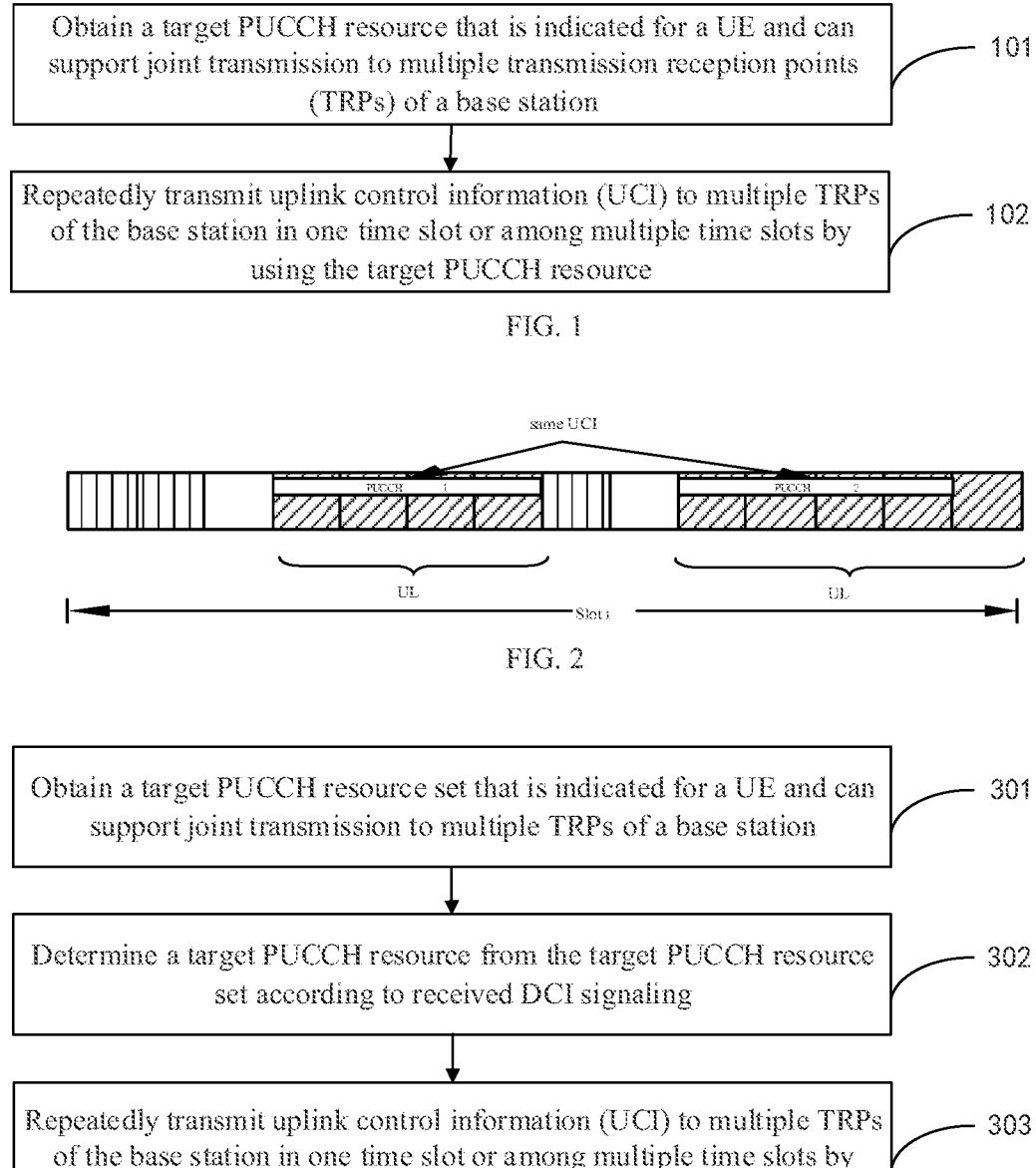

Obtain a target PUCCH resource that is indicated for a UE and can support joint transmission to multiple transmission reception points (TRPs) of a base station — 101

Repeatedly transmit uplink control information (UCI) to multiple TRPs of the base station in one time slot or among multiple time slots by using the target PUCCH resource — 102

FIG. 1 same UCI

PUCCH        1            PUCCH        2

UL                    DL

Slot i

FIG. 2

Obtain a target PUCCH resource set that is indicated for a UE and can support joint transmission to multiple TRPs of a base station — 301

Determine a target PUCCH resource from the target PUCCH resource set according to received DCI signaling — 302

Repeatedly transmit uplink control information (UCI) to multiple TRPs of the base station in one time slot or among multiple time slots by using the target PUCCH resource — 303

FIG. 3

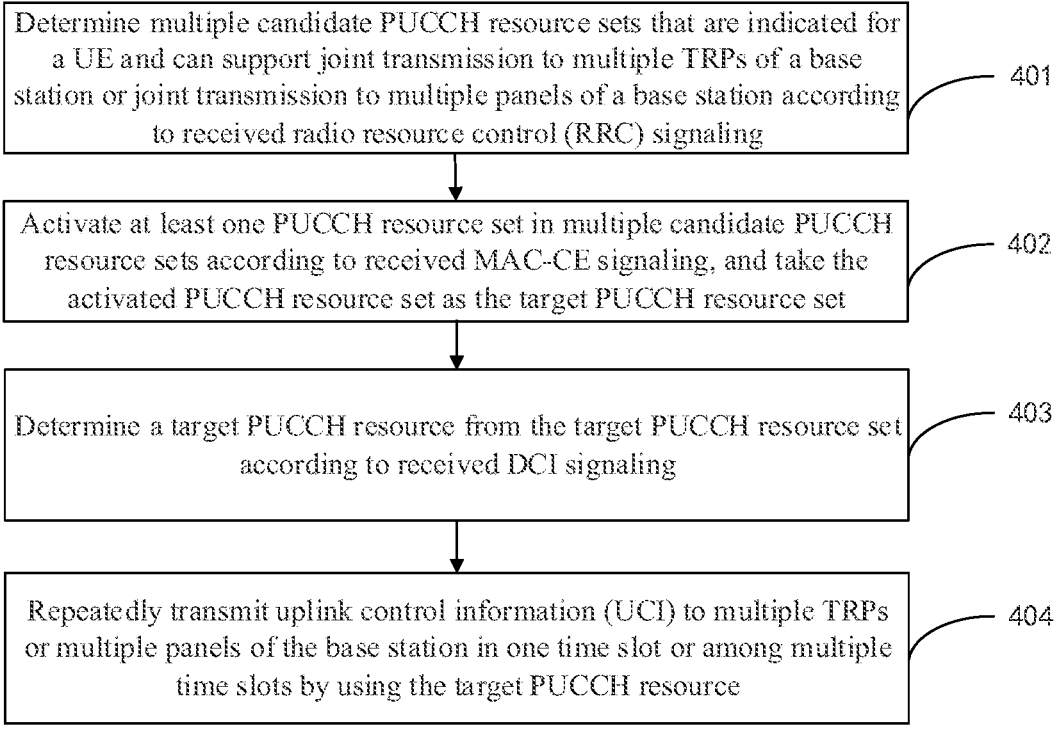

Determine multiple candidate PUCCH resource sets that are indicated for a UE and can support joint transmission to multiple TRPs of a base station or joint transmission to multiple panels of a base station according to received radio resource control (RRC) signaling — 401

Activate at least one PUCCH resource set in multiple candidate PUCCH resource sets according to received MAC-CE signaling, and take the activated PUCCH resource set as the target PUCCH resource set — 402

Determine a target PUCCH resource from the target PUCCH resource set according to received DCI signaling — 403

Repeatedly transmit uplink control information (UCI) to multiple TRPs or multiple panels of the base station in one time slot or among multiple time slots by using the target PUCCH resource — 404

FIG. 4

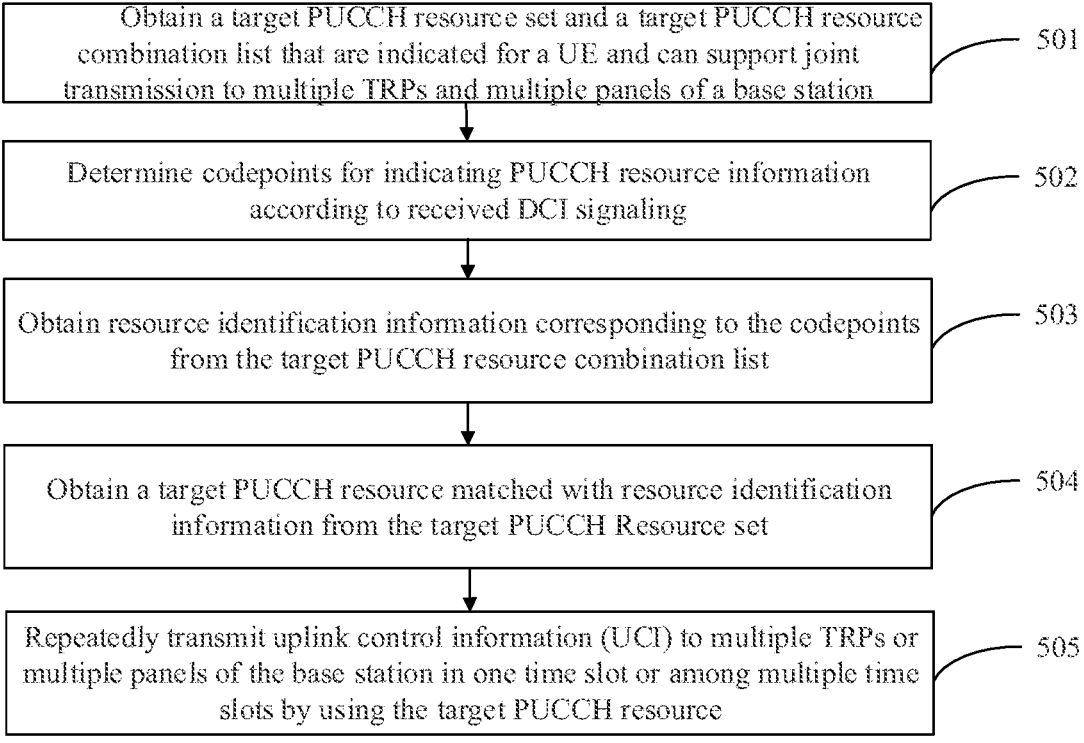

Obtain a target PUCCH resource set and a target PUCCH resource combination list that are indicated for a UE and can support joint transmission to multiple TRPs and multiple panels of a base station — 501

Determine codepoints for indicating PUCCH resource information according to received DCI signaling — 502

Obtain resource identification information corresponding to the codepoints from the target PUCCH resource combination list — 503

Obtain a target PUCCH resource matched with resource identification information from the target PUCCH Resource set — 504

Repeatedly transmit uplink control information (UCI) to multiple TRPs or multiple panels of the base station in one time slot or among multiple time slots by using the target PUCCH resource — 505

FIG. 5

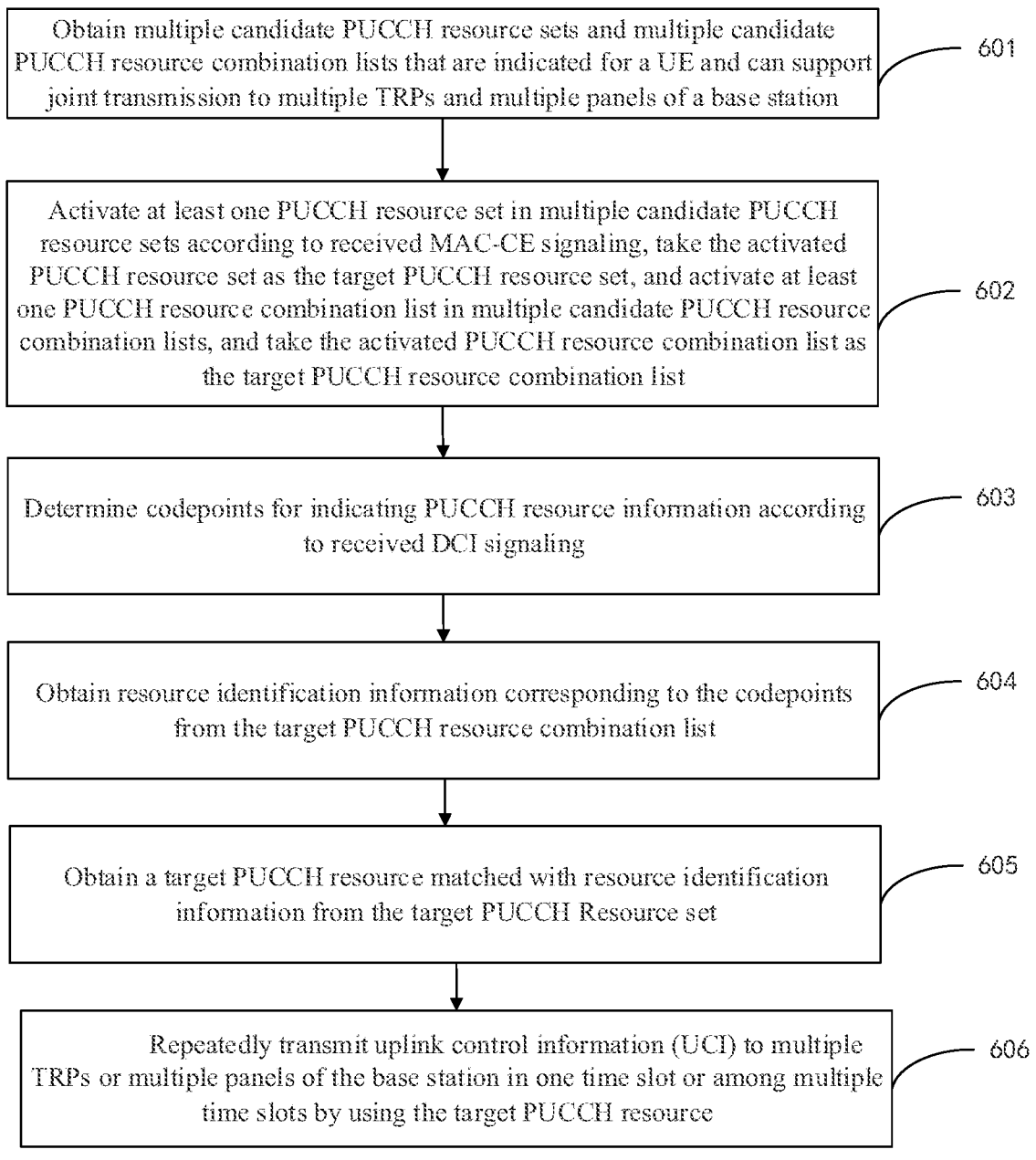

Obtain multiple candidate PUCCH resource sets and multiple candidate PUCCH resource combination lists that are indicated for a UE and can support joint transmission to multiple TRPs and multiple panels of a base station — 601

Activate at least one PUCCH resource set in multiple candidate PUCCH resource sets according to received MAC-CE signaling, take the activated PUCCH resource set as the target PUCCH resource set, and activate at least one PUCCH resource combination list in multiple candidate PUCCH resource combination lists, and take the activated PUCCH resource combination list as the target PUCCH resource combination list — 602

Determine codepoints for indicating PUCCH resource information according to received DCI signaling — 603

Obtain resource identification information corresponding to the codepoints from the target PUCCH resource combination list — 604

Obtain a target PUCCH resource matched with resource identification information from the target PUCCH Resource set — 605

Repeatedly transmit uplink control information (UCI) to multiple TRPs or multiple panels of the base station in one time slot or among multiple time slots by using the target PUCCH resource — 606

FIG. 6

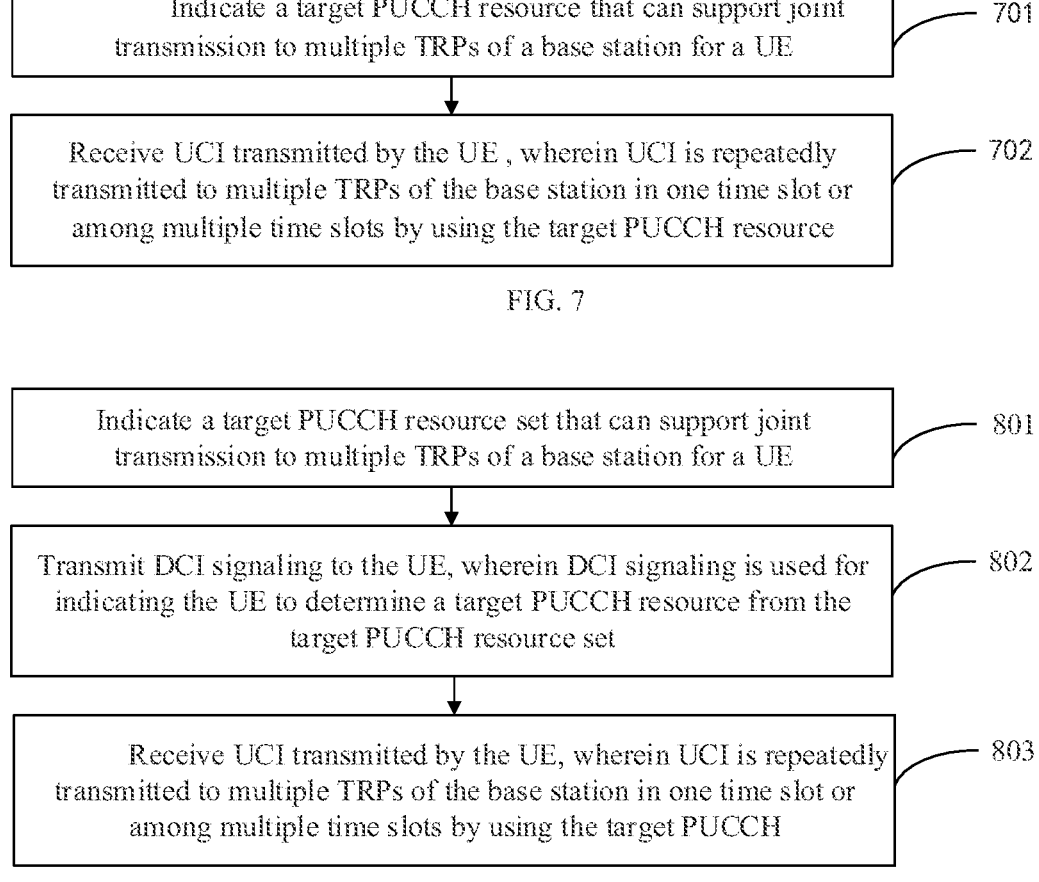

Indicate a target PUCCH resource that can support joint transmission to multiple TRPs of a base station for a UE — 701

Receive UCI transmitted by the UE , wherein UCI is repeatedly transmitted to multiple TRPs of the base station in one time slot or among multiple time slots by using the target PUCCH resource — 702

FIG. 7

Indicate a target PUCCH resource set that can support joint transmission to multiple TRPs of a base station for a UE — 801

Transmit DCI signaling to the UE, wherein DCI signaling is used for indicating the UE to determine a target PUCCH resource from the target PUCCH resource set — 802

Receive UCI transmitted by the UE, wherein UCI is repeatedly transmitted to multiple TRPs of the base station in one time slot or among multiple time slots by using the target PUCCH — 803

FIG. 8

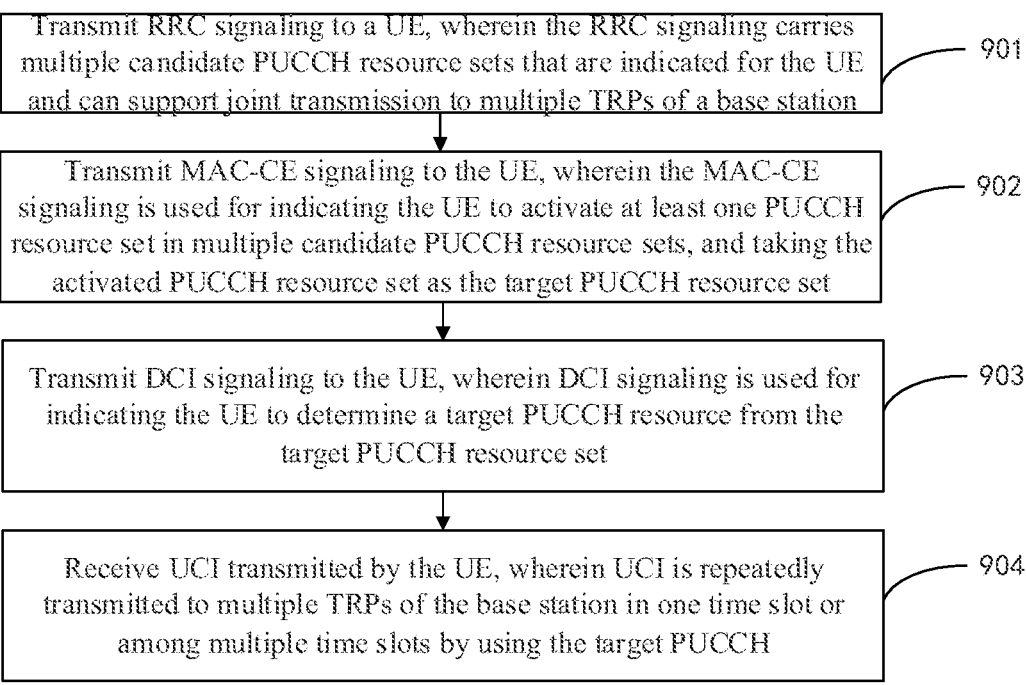

Transmit RRC signaling to a UE, wherein the RRC signaling carries multiple candidate PUCCH resource sets that are indicated for the UE and can support joint transmission to multiple TRPs of a base station — 901

Transmit MAC-CE signaling to the UE, wherein the MAC-CE signaling is used for indicating the UE to activate at least one PUCCH resource set in multiple candidate PUCCH resource sets, and taking the activated PUCCH resource set as the target PUCCH resource set — 902

Transmit DCI signaling to the UE, wherein DCI signaling is used for indicating the UE to determine a target PUCCH resource from the target PUCCH resource set — 903

Receive UCI transmitted by the UE, wherein UCI is repeatedly transmitted to multiple TRPs of the base station in one time slot or among multiple time slots by using the target PUCCH — 904

FIG. 9

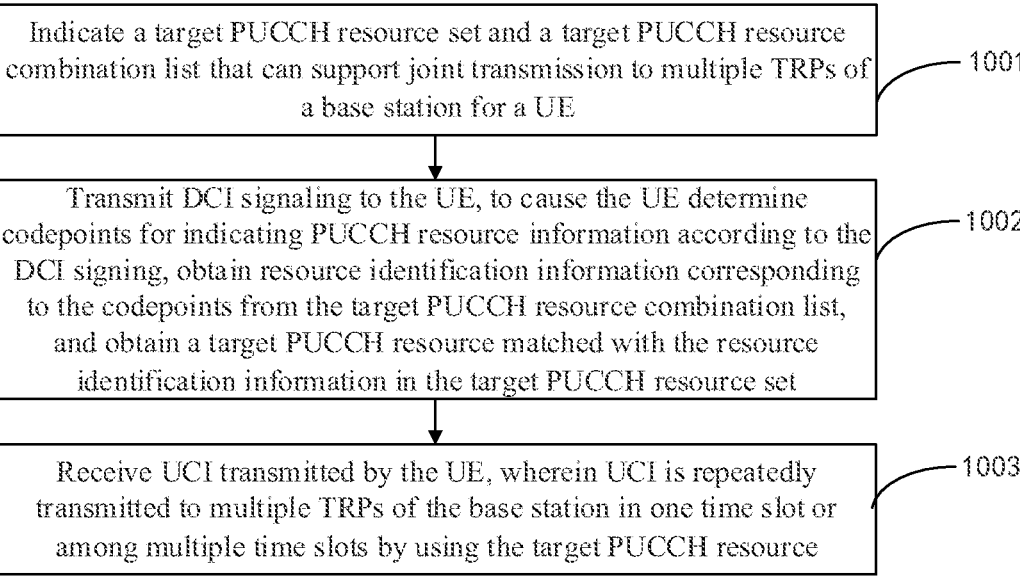

Indicate a target PUCCH resource set and a target PUCCH resource combination list that can support joint transmission to multiple TRPs of a base station for a UE ⟋ 1001

Transmit DCI signaling to the UE, to cause the UE determine codepoints for indicating PUCCH resource information according to the DCI signing, obtain resource identification information corresponding to the codepoints from the target PUCCH resource combination list, and obtain a target PUCCH resource matched with the resource identification information in the target PUCCH resource set ⟋ 1002

Receive UCI transmitted by the UE, wherein UCI is repeatedly transmitted to multiple TRPs of the base station in one time slot or among multiple time slots by using the target PUCCH resource ⟋ 1003

FIG. 10

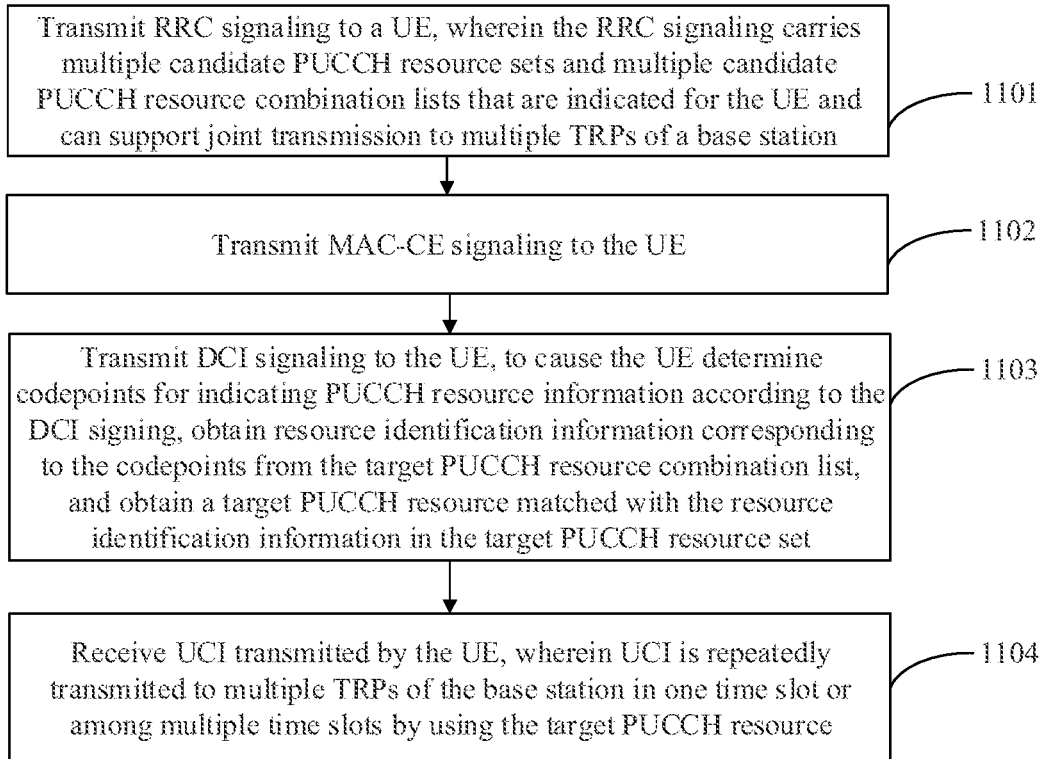

Transmit RRC signaling to a UE, wherein the RRC signaling carries multiple candidate PUCCH resource sets and multiple candidate PUCCH resource combination lists that are indicated for the UE and can support joint transmission to multiple TRPs of a base station — 1101

Transmit MAC-CE signaling to the UE — 1102

Transmit DCI signaling to the UE, to cause the UE determine codepoints for indicating PUCCH resource information according to the DCI signing, obtain resource identification information corresponding to the codepoints from the target PUCCH resource combination list, and obtain a target PUCCH resource matched with the resource identification information in the target PUCCH resource set — 1103

Receive UCI transmitted by the UE, wherein UCI is repeatedly transmitted to multiple TRPs of the base station in one time slot or among multiple time slots by using the target PUCCH resource — 1104

FIG. 11

PUCCH RESOURCE INDICATION METHOD, COMMUNICATION DEVICE AND STORAGE MEDIUM

CROSS REFERENCE TO RELATED APPLICATION

The present application is a U.S. National Phase of International Application No. PCT/CN2021/071879 entitled "PUCCH RESOURCE INDICATION METHOD AND APPARATUS," and filed on Jan. 14, 2021. The entire contents of the above-listed application are hereby incorporated by reference for all purposes.

BACKGROUND

The 3rd Generation Partnership Project (3GPP) standard organization defined three major scenarios of the Fifth-Generation Mobile Communications (5G) New Radio (NR) system at a recent meeting: Enhanced Mobile Broadband (eMBB), massive Machine Type of Communication (mMTC), and Ultra Reliable Low Latency Communication (URLLC).

SUMMARY

The disclosure relates to mobile communication field, in particular to a PUCCH resource indication method, communication device and storage medium.

The physical uplink control channel PUCCH resource indication method, communication device and storage medium proposed in the disclosure are used for solving the technical problem in relevant arts that the PUCCH resource transmission mode cannot meet the communication requirements of low delay and high reliability of URLLC.

The embodiment of the first aspect of the present disclosure provides a physical uplink control channel (PUCCH) resource indication method, the method is applied to the user equipment UE, and includes: obtaining a target PUCCH resource that is indicated for a UE and can support joint transmission to multiple transmission reception points (TRPs) of a base station, and repeatedly transmitting uplink control information (UCI) to the multiple TRPs of the base station in one time slot or among multiple time slots by using the target PUCCH resource.

The embodiment of the second aspect of the present disclosure provides a PUCCH resource indication method, the method is applied to base stations, and includes: indicating a target PUCCH resource that can support joint transmission to multiple transmission reception points (TRPs) of a base station for the UE; receiving uplink control information (UCI) transmitted by the UE, wherein the UCI is repeatedly transmitted to the multiple TRPs of the base station in one time slot or among multiple time slots by using the target PUCCH resource.

An embodiment in the third aspect of the present disclosure provides a communication device, including: at least one processor; a memory communicatively connected with the at least one processor, wherein the memory stores instructions which can be executed by the at least one processor, and instructions are executed by the at least one processor, to ensure that the at least one processor can execute the PUCCH resource indication method of the embodiment in the first aspect of the present disclosure or the PUCCH resource indication method of the embodiment in the second aspect of the present disclosure.

An embodiment in the fourth aspect of the present disclosure provides a computer storage medium storing computer-executable instructions, wherein after the computer-executable instructions are executed by a processor, the PUCCH resource indication method in the first aspect of the present disclosure can be executed, or the PUCCH resource indication method in the second aspect of the present disclosure can be executed.

Additional aspects and advantages of the present disclosure will be set forth partially in the following description, which will become obvious in the following description, or can be learned by practice of the present disclosure.

BRIEF DESCRIPTION OF THE DRAWINGS

The above and/or additional aspects and advantages of the disclosure will become obvious and comprehensible from the description of examples in conjunction with the drawings.

FIG. 1 is a schematic flow diagram of a PUCCH resource indication method according to an embodiment of the disclosure;

FIG. 2 is a schematic diagram of a PUCCH retransmission UCI according to an embodiment of the present disclosure;

FIG. 3 is a schematic flowchart of another PUCCH resource indication method according to an embodiment of the present disclosure;

FIG. 4 is a schematic flowchart of another PUCCH resource indication method according to an embodiment of the present disclosure;

FIG. 5 is a schematic flowchart of another PUCCH resource indication method according to an embodiment of the present disclosure;

FIG. 6 is a schematic flowchart of another PUCCH resource indication method according to an embodiment of the present disclosure.

FIG. 7 is a schematic flowchart of another PUCCH resource indication method according to an embodiment of the present disclosure;

FIG. 8 is a schematic flowchart of another PUCCH resource indication method according to an embodiment of the present disclosure;

FIG. 9 is a schematic flowchart of another PUCCH resource indication method according to an embodiment of the present disclosure;

FIG. 10 is a schematic flowchart of another PUCCH resource indication method according to an embodiment of the present disclosure;

FIG. 11 is a schematic flowchart of another PUCCH resource indication method according to an embodiment of the present disclosure;

DETAILED DESCRIPTION

Figure 12:
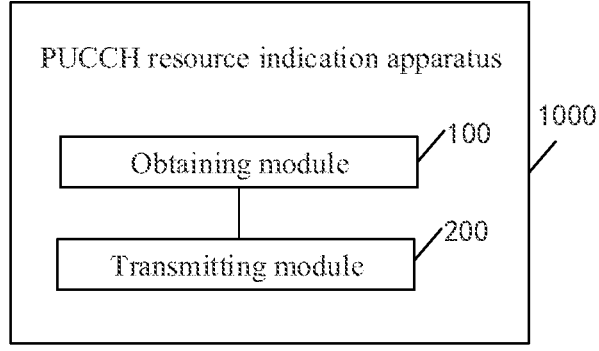
FIG. 12 is a structure diagram of a PUCCH resource indication apparatus according to an embodiment of the present disclosure.

Examples will be described in detail here, and instances thereof are shown in the accompanying drawings. The following description refers to the accompanying drawings in which the same numbers in different figures represent the same or similar elements unless otherwise indicated. Implementations described in the following examples do not represent all implementations consistent with the embodiments of the present disclosure. Instead, they are merely examples of apparatuses and methods consistent with some aspects of the embodiments of the present disclosure described as detailed in the appended claims.

The terms used in the embodiments of the present disclosure are merely for the purpose of describing specific embodiments, and are not intended to limit the embodiments of the present disclosure. The singular forms such as "a/an" and "the" used in the examples of the disclosure and the appended claims are also intended to include the plural forms, unless otherwise clearly stated in the context. It is to be further understood that the term "and/or" used herein refers to and includes any of one or more of the associated listed items or all possible combinations.

It is to be understood that although the terms such as first, second and third may be used to describe various information in the examples of the disclosure, the information is not intended to be limited to the terms. The terms are merely used to distinguish the same type of information from each other. For instance, without departing from the scope of the examples of the disclosure, first information can also be called second information, and similarly, second information can also be called first information. Depending on the context, the words "if" and "under the condition" as used herein can be interpreted as "when" or "at the time of" or "in response to determining".

The examples of the disclosure are described in detail below, and the examples are illustratively shown in accompanying drawings, throughout which identical or similar reference numerals denote identical or similar elements. The examples described with reference to the accompanying drawings are illustrative and only intended to explain the disclosure, instead of being construed as limiting the disclosure.

Taking URLLC as an example, when UE transmits uplink control information (UCI) by using physical uplink control channel (PUCCH) resources, if the transmission is based on the existing PUCCH resource transmission mode, the time delay and transmission quality cannot meet the requirements of low latency and high reliability communication of URLLC.

The physical uplink control channel (PUCCH) resource indication method, apparatus, communication device and storage medium provided by the present disclosure will be described in detail below with reference to the accompanying drawings.

FIG. 1 is a schematic flowchart of an a PUCCH resource indication method provided by the present disclosure. It should noted that the PUCCH resource indication method provided by the present disclosure can be executed on user equipment (UE).

As shown in FIG. 1, the PUCCH resource indication method provided by the present disclosure may further include:

Step 101, obtaining a target PUCCH resource that is indicated for a UE and can support joint transmission to multiple transmission reception points (TRPs) of a base station.

In all embodiments of the present disclosure, the method can further be applied to a technical solution of joint transmission to multiple antenna panels. That is to say, step 101 may be: obtaining a target PUCCH resource that is indicated for a UE and can support joint transmission to multiple antenna panels of a base station.

In all embodiments of the present disclosure, the method can further be applied to any technical solution of joint transmission. That is to say, step 101 is: obtaining a target PUCCH resource that is indicated for a UE and can support joint transmission to a base station.

In some embodiments of the present disclosure, a target PUCCH resource that is indicated for a UE and can support joint transmission to multiple TRPs (Transmission Receive Points) of a base station can be determined according to control signaling transmitted to the UE. That is, in one embodiment, a target PUCCH resource that is indicated for a UE and can support joint transmission to multiple TRPs of a base station can be determined according to control signaling transmitted to the UE. In another embodiment, a target PUCCH resource that is indicated for the UE and can support joint transmission to multiple panels of a base station can be determined according to control signaling transmitted to the UE. In yet another embodiment, a target PUCCH resource that is indicated for a UE and can support joint transmission to a base station can be determined according to control signaling transmitted to the UE.

In one embodiment, control signaling can carry a target PUCCH resource that is indicated for a UE and can support joint transmission to multiple TRPs of a base station. In another embodiment, control signaling can further carry a target PUCCH resource that is indicated for a UE and can support joint transmission to multiple panels of a base station. In yet other embodiments, control signaling can further carry a target PUCCH resource that is indicated for a UE and can support joint transmission to multiple base stations and multiple TRPs. In some other embodiments, control signaling can further carry a target PUCCH resource that is indicated for a UE and can support joint transmission to a base station.

After a UE obtains the control signaling, a target PUCCH resource that is indicated for the UE and can support joint transmission to multiple TRPs of the base station can be determined according to the control signaling. Or after a UE obtains the control signaling, a target PUCCH resource that is indicated for the UE and can support joint transmission to base station multiple antenna panels can be determined according to control signaling. Or after a UE obtains the control signaling, a target PUCCH resource that is indicated for a UE and can support joint transmission to a base station can be determined according to control signaling.

The aforementioned control signaling can be upper layer signaling. Upper layer signaling includes radio resource control (RRC) signaling and/or medium access control (MAC) control element (CE) MAC-CE signaling.

The quantity of the aforementioned target PUCCH resource(s) can be one or more, which is not specifically limited in this embodiment. In practical applications, the quantity of the target PUCCH resources can be indicated according to actual needs.

In some embodiments, when the quantity of the target PUCCH resource is one, in order to achieve multiple transmissions, the aforementioned target PUCCH resource can correspond to multiple different beams. For example, the aforementioned target PUCCH resource can correspond to two different beams. That is in one embodiment, in order to achieve multiple TRP transmission, the one target PUCCH resource can correspond to multiple different beams. In order to support multiple panel joint transmission, the one target PUCCH resource can correspond to multiple different beams.

In some other embodiments, when the quantity of the target PUCCH resources is mulitiple, the plurality of target PUCCH resources can correspond to one beam or multiple different beams, which is not specifically limited in the embodiment.

For example, the quantity of the aforementioned target PUCCH resources is two, and each target PUCCH resource corresponds to a beam, or each target PUCCH resource corresponds to two beams, or one of the two target PUCCH resources corresponds to one beam, and the other target PUCCH resource corresponds to two beams.

It can be understood that different PUCCH resources may correspond to different PUCCH formats. Certainly different PUCCH resources can further correspond to the same PUCCH format.

PUCCH is an uplink physical channel in a new radio (NR for short) system, and carries uplink control information (UCI).

In order to support transmission of different UCI bit number ranges, 5 PUCCH frame formats are defined in the NR system, wherein a PUCCH parameter example in the PUCCH format is as shown in Table 1.

TABLE 1

| PUCCH parameters in PUCCH format | | | |
|---|---|---|---|
| PUCCH format | Symbol length | Quantity of resource blocks (RBs) | Number of carrying bits |
| 0 | 1-2 | 1 | ≤2 |
| 1 | 4-14 | 1 | ≤2 |
| 2 | 1-2 | 1, 2 . . . 16 integer | >2 |
| 3 | 4-14 | 1, 2, 3, 4, 5, 6, 8, 9, 10, 12, 15, 16 | >2 |
| 4 | 4-14 | 1 | >2 |

It can be seen from the aforementioned Table 1 that PUCCH formats 0 and 1 can only carry data smaller than or equal to 2 bits, while PUCCH formats 2/3/4 can carry data greater than 2 bits.

It can be understood that each element and each corresponding relationship in Table 1 exists independently; the elements and corresponding relationships are exemplarily listed in the same table, however it does not represent all elements and corresponding relationships must exist simultaneously according to those shown in Table 1. The value of each element and each corresponding relationship are not dependent on any other element value or corresponding relationship in Table 1. Therefore, those skilled in the art can understand that each of the value of each element and each corresponding relationship in Table 1 is an independent embodiment.

In some implementations of the present disclosure, the aforementioned PUCCH resources include at least one of the following parameters:

pucch-ResourceId: a PUCCH resource index startingPRB (Physical Resource Block): a starting PRB index intraSlotFrequencyHopping: an inter-slot frequency hopping mode format: a configured PUCCH format, from format 0 to format 4.

Step 102, repeatedly transmitting uplink control information (UCI) to multiple TRPs of the base station in one time slot or among multiple time slots by using a target PUCCH resource.

In all embodiments of the present disclosure, the scheme can further be applied to joint transmission to multiple antenna panels. That is step 102 is repeatedly transmitting uplink control information (UCI) to multiple panels of a base station in one time slot or among multiple time slots by using a target PUCCH resource.

In all embodiments of the present disclosure, the scheme can further be applied to any transmission scheme of joint transmission. That is step 102 is repeatedly transmitting uplink control information (UCI) to joint transmission to a base station in one time slot or among multiple time slots by using a target PUCCH resource.

In the case that the quantity of the target PUCCH resources is multiple, in order to improve the transmission quality, the multiple target PUCCH resources do not overlap at all in terms of time-frequency domain. Certainly in the case that the quantity of the target PUCCH resources is multiple, the foregoing multiple target PUCCH resources do not completely overlap in terms of time-frequency domain.

In some embodiments, in a service scenario in which a target PUCCH resource is indicated for the UE to transmit UCI and repeated transmission is performed by using a time slot, the UE can perform repeated transmission on the target PUCCH resource in preset one or more time slots (for example, one time slot) according to the times N of repeated transmission of the target PUCCH resource, so as to achieve the retransmission of the UCI.

For example, in the case that the quantity of the PUCCH resource is one, and the times of repeated transmission is two, an example of repeated transmission of a target PUCCH resource carrying the same UCI in one time slot is as shown in FIG. 2.

It should be noted that, in the one embodiment, the aforementioned target PUCCH resource corresponds to multiple different beams that can support joint transmission to multiple TRPs of the base station. In another embodiment, the aforementioned target PUCCH resource corresponds to multiple different beams that can support joint transmission to multiple panels of a base station. In yet another embodiment, the aforementioned target PUCCH resource corresponds to multiple different beams that can support joint transmission.

The number of transmission times of the transmission occasions corresponding to different beams can be obtained by dividing the times N of repeated transmission of the target PUCCH resource according to a preset rule.

In some other embodiments, when the UCI is transmitted by using a target PUCCH resource, and the UCI is repeatedly transmitted to multiple TRPs of a base station in multiple time slots, the UE can repeatedly transmit the target UCI resource carrying the UCI in multiple time slots according to the times N of repeated transmission of the target PUCCH resource. N is an integer greater than 1.

In yet some other embodiments, when the UCI is transmitted by using a target PUCCH resource, and the UCI is repeatedly transmitted to multiple base panels in multiple time slots, the UE can repeatedly transmit the target UCI resource carrying the UCI in multiple time slots according to the times N of repeated transmission of the target PUCCH resource. N is an integer greater than 1.

It can be understood that in order to improve transmission reliability, the aforementioned multiple time slots is sequentially adjacent, that is to say, the aforementioned multiple time slots is continuous.

In yet some other embodiments, in the scenario where UCI is transmitted by using multiple target resources and is repeatedly transmitted by using multiple time slots, the UE can obtain the number of repeated transmission times of each target PUCCH resource, and repeatedly transmit the UCI to multiple TRPs of the base station in multiple time slots according to the number of repeated transmission times of each target PUCCH resource.

In yet another embodiment, in the scenario where UCI is transmitted by using multiple target resources and is repeatedly transmitted by using multiple time slots, the UE can obtain the number of repeated transmission times of each target PUCCH resource, and repeatedly transmit the UCI to multiple panels of a base station in multiple time slots according to the number of repeated transmission times of each target PUCCH resource.

In yet some other embodiments, in the scenario where UCI is transmitted by using multiple target resources and is repeatedly transmitted in one time slot, the UE can obtain the number of repeated transmission times of each target PUCCH resource, and repeatedly transmit the UCI to multiple TRPs of the base station in one time slot according to the number of repeated transmission times of each target PUCCH resource.

In yet some other embodiments, in the scenario where UCI is transmitted by using multiple target resources and is repeatedly transmitted in one time slot, the UE can obtain the number of repeated transmission times of each target PUCCH resource, and repeatedly transmit the UCI to multiple panels of a base station in one time slot according to the number of repeated transmission times of each target PUCCH resource.

It should be noted that the times of repeated transmission corresponding to each of the aforementioned target PUCCH resources can be the same, or can be different, or can be partially the same, which is not specifically limited in the embodiment.

For example, the quantity of the aforementioned target PUCCH resources is two, respectively, the number of repeated transmission times corresponding to a first target PUCCH resource is 2, and the number of repeated transmission times corresponding to a second target PUCCH resource is 1, UCI can be repeatedly transmitted to multiple TRPs or multiple panels of a base station by using the first target PUCCH resource in combination with the number of repeated transmission times corresponding to the first target PUCCH resource or the UCI can be repeatedly transmitted to multiple TRPs or multiple panels of a base station by using the second target PUCCH resource in combination with the number of repeated transmission times corresponding to the first target PUCCH resource in one time slot. UCI carried by the first target PUCCH resource and the second target PUCCH resource can be the same.

The times N of repeated transmission of the target PUCCH resource is an integer greater than or equal to 1, for example, the times N of repeated transmission can be 2, 4 or 8, etc., which is not specifically limited in the embodiment.

In some embodiments, the aforementioned number of repeated transmission times can be configured for the UE through upper layer signaling, or can further be determined by the UE according to communication standards.

Specifically, the UE can receive upper layer signaling transmitted by the UE, wherein the upper layer signaling carries the number of repeated transmission times of the target PUCCH resource. Correspondingly, when the UE determines that UCI is required to be transmitted, the UE repeatedly transmits the target PUCCH resource according to the number of repeated transmission times of the target PUCCH resource.

In some embodiments, it can be determined based on the indication signaling transmitted by a base station whether the repeated transmission mode is used in one time slot or among time slots, wherein the indication signaling includes a repeated a transmission mode which is a repeated transmission mode in a time slot or a repeated transmission mode among time slots. In some other embodiments, it can further be determined by the UE based on a repeated transmission rule in a communication protocol standard used by the UE and a base station.

In some embodiments, the aforementioned upper layer signaling can be RRC signaling. In some other embodiments, the aforementioned upper layer signaling are RRC signaling and MAC CE signaling.

In the PUCCH resource indication method in an embodiment of the present disclosure, a UE obtains a target PUCCH resource that can support joint transmission to multiple TRPs of a base station, and repeatedly transmits uplink control information (UCI) to the multiple TRPs of the base station in one time slot or among multiple time slots by using the target PUCCH resource. Hence, the transmission and feedback of UCI are enhanced by using the multiple TRPs, and the UCI is repeatedly transmitted by using the PUCCH resource, so that the transmission quality and reliability of the UCI can be improved, thereby satisfying the communication requirement of the ultra-reliable low latency communication service.

As a possible implementation, as shown in FIG. 3, the PUCCH resource indication method provided by the present disclosure can be implemented, and can further be implemented in combination with other methods. The method may include:

Step 301, obtaining a target PUCCH resource set that is indicated for a UE and can support joint transmission to multiple TRPs of a base station.

In all embodiments of the present disclosure, the scheme can further be applied to a scenario of joint transmission to multiple antenna panels. That is step 301 is: obtaining a target PUCCH resource set that is indicated for a UE and can support joint transmission to multiple panels of a base station.

In all embodiments of the present disclosure, in a scenario the scheme in which any joint transmission to a base station. That is step 301 is obtaining a target PUCCH resource set that is indicated for a UE and can support joint transmission to a base station.

In some embodiments of the present disclosure, a target PUCCH resource set that is indicated for a UE and can support joint transmission to multiple TRPs of the base station can be determined according to control signaling transmitted to the UE. The control signaling can carry a target PUCCH resource set that is indicated for the UE and can support joint transmission to multiple TRPs of a base station.

In some other embodiments of the present disclosure, a target PUCCH resource set that is indicated for a UE and can support joint transmission to multiple panels of a base station can be determined according to control signaling transmitted to the UE. The control signaling can carry a target PUCCH resource set that is indicated for a UE and can support joint transmission to base station panels.

In yet some other embodiments of the present disclosure, a target PUCCH resource set that is indicated for a UE and can support joint transmission to a base station can be determined according to control signaling transmitted to the UE. The control signaling can carry a target PUCCH resource set that is indicated for a UE and can support joint transmission to a base station.

After a UE obtains the control signaling, a target PUCCH resource set that is indicated for the UE and can support joint transmission to multiple TRPs of a base station can be determined according to the control signaling. Or after a UE obtains the control signaling, a target PUCCH resource set that is indicated for the UE and can support joint transmission to multiple antenna panels of a base station can be determined according to the control signaling. Or after a UE obtains the control signaling, a target PUCCH resource set that is indicated for a UE and can support joint transmission to a base station can be determined according to the control signaling.

The quantity of the aforementioned PUCCH resource set(s) may be one or more.

Step 302, determining a target PUCCH resource from the target PUCCH resource set according to received DCI signaling.

The quantity of the aforementioned PUCCH resource(s) can be one or more.

Step 303, repeatedly transmitting uplink control information (UCI) to multiple TRPs of a base station in one time slot or among multiple time slots by using a target PUCCH resource.

Step 303 is the same as the aforementioned step 102. For the specific implementation process of step 303, please refer to the specific description of step 102 in the aforementioned embodiment, and details are not repeated here. That is, being the same as the previous embodiment, the repeated transmitting in the scheme can be applied in the scenario of joint transmission to multiple TRPs, can further be applied in the scenario of joint transmission to multiple panels, and can further be applied in the scenario of joint transmission in any mode.

In the embodiment, a UE obtains a target PUCCH resource set that can support joint transmission to multiple TRPs or multiple panels of a base station, and determines a target PUCCH resource from the target PUCCH resource set according to DCI signaling transmitted by the UE, and repeatedly transmit UCI to multiple TRPs or multiple antenna panels of a base station in one time slot or among multiple time slots by using the target PUCCH resource. Hence, the transmission and feedback of UCI are enhanced by using the multiple TRPs or multiple panels, and the UCI is repeatedly transmitted by using the PUCCH resource, so that the transmission quality and reliability of the UCI can be improved, thereby satisfying the communication requirement of the ultra-reliable low latency communication service.

As a possible implementation, as shown in FIG. 4, the PUCCH resource indication method provided by the present disclosure can be implemented, and can further be implemented in combination with other methods. Being the same as the previous embodiment, the scheme can be applied in the scenario of joint transmission to multiple TRPs, can further be applied in the scenario of joint transmission to multiple panels, and can further be applied in the scenario of joint transmission in any mode. The method may include:

Step 401, determining multiple candidate PUCCH resource sets that are indicated for a UE and can support joint transmission to multiple TRPs or multiple panels of a base station according to received radio resource control (RRC) signaling.

Step 402, activating at least one PUCCH resource set in multiple candidate PUCCH resource sets according to received medium access control element (MAC-CE) signaling, and taking the activated PUCCH resource set(s) as the target PUCCH resource set.

Step 403, determining a target PUCCH resource from the target PUCCH resource set according to received DCI signaling.

Step 404, repeatedly transmitting uplink control information (UCI) to multiple TRPs or multiple panels of the base station in one time slot or among multiple time slots by using the target PUCCH resource.

In the embodiment, the UE archived the indication of the target PUCCH resource to the supported multiple TRPs or multiple panels according to received RRC signaling, MAC-CE signaling and DCI signaling, and then repeatedly transmits UCI to multiple TRPs or multiple panels of a base station by using the target PUCCH resource in one or more time slots. Hence, the transmission and feedback of UCI are enhanced by using the multiple TRPs or multiple panels, and the UCI is repeatedly transmitted by using the PUCCH resource, so that the transmission quality and reliability of the UCI can be improved, thereby satisfying the communication requirement of the ultra-reliable low latency communication service.

It can be understood that in any of the aforementioned embodiments, the step of determining a target PUCCH resource from the target PUCCH resource set according to DCI signaling can be achieved in various modes in different application scenarios, and examples are as follows:

In some embodiments, an resource identifier is obtained in DCI signaling in response to determining that the quantity of the target PUCCH resource set is one and the quantity of the target PUCCH resources is one, and a target PUCCH resource is determined from the target PUCCH resource set according to the resource identifier.

In some embodiments, a field content of PUCCH resource indicator (PRI) field in DCI signaling can be determined, and a resource identifier in the DCI signaling can be determined according to the field content.

In some other embodiments, multiple resource identifiers are obtained in DCI signaling in response to determining that the quantity of the target PUCCH resource set is one and the quantity of the target PUCCH resources is multiple; and multiple target PUCCH resources are determined from the target PUCCH resource set according to the multiple resource identifiers.

In some other embodiments, multiple resource identifiers are obtained in DCI signaling in response to determining that the quantity of the target PUCCH resource sets is multiple and the quantity of the target PUCCH resources is multiple; target PUCCH resource sets to be selected are determined from the multiple target PUCCH resource sets for each resource identifier; target PUCCH resources matched with the resource identifiers are determined from the target PUCCH resource sets to be selected.

In an embodiment of the present disclosure, in different scenarios, the aforementioned obtaining multiple resource identifiers in DCI signaling can be achieved in various modes, and examples are as follows:

As an example, a resource identifier can be resolved from each resource indication field in DCI signaling respectively.

It can be understood that the resource indication field in the example can be obtained by redefining DCI signaling with the existing communication standard.

For example, the quantity of the aforementioned target PUCCH resources is two, in order to obtain a resource identifier corresponding to each PUCCH resource from DCI signaling, two resource indication fields in the DCI signaling can be respectively resolved to obtain a resource identifier corresponding to each the target PUCCH resource.

As an example, multiple resource identifiers can be resolved from one resource indication field in DCI signaling.

It can be understood that the aforementioned resource indication field in the example can be obtained by extending a PRI field in DCI signaling with the existing communication standard.

For example, the quantity of target PUCCH resources is two, correspondingly, resource identifiers corresponding to the two PUCCH resources can be resolved from one resource indication field in DCI.

Resolving multiple resource identifiers from one resource indication field in DCI signaling can be achieved in various modes, and examples are as follows:

As an example, one resource indication field in DCI signaling can be resolved to obtain codepoints for indicating PUCCH resource information, and then multiple resource identifiers are obtained according to the codepoints.

In the embodiment, in order to obtain multiple resource identifiers according to codepoints, corresponding relationship between the codepoints and resource identification information can be prestored in UE in advance.

As an example, field content of resource indication field in DCI signaling can be obtained, then the field content is resolved according to resolving rule to obtain multiple resource identifiers.

It can be understood that in different application scenarios, implementations of determining target PUCCH resource sets to be selected from multiple target PUCCH resource sets for each resource identifier are different, and the exemplary description is as follows:

As an example, in response to determining a mapping relationship among codepoint and resource identifier and the resource set identifier exists in the UE, resource set identifiers matched with the codepoints and the resource identifier obtained from DCI signals can be obtained from the mapping relationship for each resource identifier, and PUCCH resource set matched with the resource set identifier is obtained from multiple target PUCCH resource sets to serve as a target resource set to be selected.

As another example, in response to determining a mapping relationship among codepoint and resource identifier and the resource set identifier does not exist in the UE, a target PUCCH resource set to be selected can be determined from multiple target PUCCH resource sets for each resource identifier according to preset rule in UE.

For example, the quantity of PUCCH resource sets in which target PUCCH resources is situated is two, wherein the target PUCCH resources is configured for a UE and suitable for joint transmission, and a resource identifier sequence obtained according to DCI signaling includes two resource identifiers, the first resource identifier 1, and the second resource identifier 2. It is assumed that the preset rule include: the first resource identifier 1 belongs to a target PUCCH resource set with a smaller resource set identifier, and the second resource identifier 2 belongs to the target resource set with a larger resource set identifier. It is assumed that the quantity of target PUCCH resources is two, the resource set identifier of the target PUCCH resource set 1 is 1, and the resource set identifier of the target PUCCH resource set 2 is 3. At this time, based on the preset rule, it can be determined that the first resource identifier 1 belongs to the target PUCCH resource set 1 with the resource set identifier being 1, and the second resource identifier 2 belongs to the target PUCCH resource set 3 with the resource set identifier being 3.

For another example, the quantity of PUCCH resource sets in which target PUCCH resources is situated is two, wherein the target PUCCH resources is configured for a UE and suitable for joint transmission and a resource identifier sequence obtained according to DCI signaling includes two resource identifiers, the first resource identifier 1, and the second resource identifier 2. It is assumed that the preset rule includes: the first resource identifier 1 belongs to a target PUCCH resource set with a larger resource set identifier, and the second resource identifier 2 belongs to the target resource set with a smaller resource set identifier. It is assumed that the quantity of target PUCCH resources is two, the resource set identifier of the target PUCCH resource set 1 is 1, and the resource set identifier of the target PUCCH resource set 2 is 3. At this time, based on the preset rule, it can be determined that the first resource identifier 1 belongs to the target PUCCH resource set 2 with the resource set identifier being 3, and the second resource identifier 2 belongs to the target PUCCH resource set 1 with the resource set identifier being 1.

It should be noted that when referring to transmission based on multiple TRPs in previous section, generally two TRPs are taken as examples. This is because in the current related art of transmission cooperation based on multiple TRPs, a maximum of two TRPs is limited. Therefore, in the examples in the embodiment, in the cases where the quantity of target PUCCH resources is multiple, two PUCCH resources are taken as examples. It can be understood that this embodiment can be applied to the cases of transmission based on more TRPs, which is not limited.

As a possible implementation, as shown in FIG. 5, the PUCCH resource indication method provided by the present disclosure can be implemented, and can further be implemented in combination with other methods. Being the same as the previous embodiment, the scheme can be applied in the scenario of joint transmission to multiple TRPs, can further be applied in the scenario of joint transmission to multiple panels, and can further be applied in the scenario of joint transmission in any mode. The method may include:

Step 501, obtaining a target PUCCH resource set and a target PUCCH resource combination list that are indicated for a UE and can support joint transmission to multiple TRPs and multiple panels of a base station.

In some embodiments of the present disclosure, a target PUCCH resource set and a target PUCCH resource combination list that are indicated for a UE and can support joint transmission to multiple TRPs of a base station can be determined according to received control signaling. The control signaling carries a target PUCCH resource set and a target PUCCH resource combination list that is indicated for a UE and can support joint transmission to multiple TRPs of a base station.

In some other embodiments of the present disclosure, a target PUCCH resource set and a target PUCCH resource combination list that are indicated for a UE and can support joint transmission to multiple panels of a base station can be obtained according to received control signaling. The control signaling carries a target PUCCH resource set and a target PUCCH resource combination list that is indicated for a UE and can support joint transmission to panels of a base station. In some embodiments, the aforementioned control signaling can be RRC signaling.

In one embodiment, a UE can indicate a target PUCCH resource set and a target PUCCH resource combination list that can support joint transmission to multiple TRPs of a base station for the UE according to received RRC signaling. In another embodiment, a UE can indicate a target PUCCH resource set and a target PUCCH resource combination list that can support joint transmission to multiple panels of a base station for the UE according to received RRC signaling.

The quantity of the aforementioned PUCCH resource sets can be one or more.

The aforementioned target PUCCH resource combination list can include resource combination information corresponding to UCI payloads in various sizes.

Step 502, determining codepoints for indicating PUCCH resource information according to received DCI signaling.

Step 503, obtaining resource identification information corresponding to the codepoints from the target PUCCH resource combination list.

It can be understood that, in some embodiments, in the case that the target PUCCH resource combination list includes a corresponding relationship between codepoints and resource identifiers, the aforementioned resource identification information can include resource identifier but does not include resource set identifier. In some other embodiments, in the case that the target PUCCH resource combination list includes a corresponding relationship among codepoint, resource identifier and resource set identifier to which the resource identifier belong, the resource identification information can further include resource identifier and resource set identifier to which the resource identifier belong.

In some embodiments, the example of the part of a PUCCH resource combination list including combination relationship between codepoints and two resources is as shown in Table 2.

TABLE 2

| PUCCH resource combination list | | |
| PRI codepoint | PRI1 | PRI2 |
| --- | --- | --- |
| 0 | 3 | NAN |
| 1 | 5 | NAN |
| 2 | 3 | 5 |
| . . . | . . . | . . . |
| . . . | . . . | . . . |
| N | 2 | 7 |

It should be noted that the aforementioned Table 2 takes a maximum of two PUCCH resources as examples, assuming that the first target PUCCH resource and the second target PUCCH resource are used respectively, PRI1 represents the resource identifier of the first target PUCCH resource, and the value of PRI2 represents the resource identifier of the second target PUCCH resource.

It can be understood that each element and each corresponding relationship in Table 2 exists independently; the elements and corresponding relationships are exemplarily listed in the same table, however it does not represent all elements and corresponding relationships must exist simultaneously according to those shown in Table 2. The value of each element and each corresponding relationship are not dependent on any other element value or corresponding relationship in Table 2. Therefore, those skilled in the art can understand that each of the value of each element and each corresponding relationship in Table 2 is an independent embodiment.

In some other embodiments, the example of the part of a PUCCH resource combination list including a combination of codepoints, two target PUCCH resource sets and two target PUCCH resources is as shown in the aforementioned Table 3.

TABLE 3

| PUCCH resource corresponding relationship table | | | | |
| PRI codepoint | PRI1 (first resource identifier) | Resource set ID1 | PRI2 (second resource identifier) | Resource set ID2 |
| --- | --- | --- | --- | --- |
| 0 | 3 | 1 | NAN | NAN |
| 1 | 2 | 1 | 4 | 1 |
| 2 | 4 | 1 | 3 | 3 |
| . . . | . . . | . . . | . . . | . . . |
| . . . | . . . | . . . | . . . | . . . |
| M | 5 | 1 | 4 | 2 |

It should be noted that the aforementioned Table 3 takes a maximum of two PUCCH resources and a maximum of two PUCCH resource sets as an example, wherein PRI1 in Table 3 represents the resource identifier of the first target PUCCH resource, and the value of PRI2 represents the resource identifier of the second target PUCCH resource. The resource set identifier 1 indicates the resource set identifier of the first target PUCCH resource set, and the resource set identifier 2 indicates the resource set identifier of the second target PUCCH resource set.

It can be understood that each element and each corresponding relationship in Table 3 exists independently; the elements and corresponding relationships are exemplarily listed in the same table, however it does not represent all elements and corresponding relationships must exist simultaneously according to those shown in Table 1. The value of each element and each corresponding relationship are not dependent on any other element value or corresponding relationship in Table 3. Therefore, those skilled in the art can understand that each of the value of each element and each corresponding relationship in Table 3 is an independent embodiment.

Step 504, obtaining a target PUCCH resource matched with resource identification information from the target PUCCH resource set.

Step 505, repeatedly transmitting uplink control information (UCI) to multiple TRPs or multiple panels of the base station in one time slot or among multiple time slots by using the target PUCCH resource.

For specific implementation of step 505, relevant descriptions in the aforementioned embodiment can be referred to, and details are not repeated here.

In the embodiment, a UE obtains a target PUCCH resource set and a target PUCCH resource combination list that are indicated for the UE and can support joint transmission to multiple TRPs or multiple panels of the base station; codepoints for indicating PUCCH resource information is determined according to received DCI signaling; resource identification information corresponding to codepoints from the target PUCCH resource combination list; the target PUCCH resource matched with the resource identification information is obtained from the target PUCCH resource set(s), and UCI is repeatedly transmitted to multiple TRPs of the base station or multiple panels in one time slot or among multiple time slots. Hence, the transmission and feedback of UCI are enhanced by using the multiple TRPs or multiple panels, and the UCI is repeatedly transmitted by using the PUCCH resource, so that the transmission quality and reliability of the UCI can be improved, thereby satisfying the communication requirement of the ultra-reliable low latency communication service.

As a possible implementation, as shown in FIG. 6, the PUCCH resource indication method provided by the present disclosure can be implemented, and can further be implementedin combination with other methods. Being the same as the previous embodiment, the scheme can be applied in the scenario of joint transmission to multiple TRPs, can further be applied in the scenario of joint transmission to multiple panels, and can further be applied in the scenario of joint transmission in any mode. The method can include:

Step 601, obtaining multiple candidate PUCCH resource sets and multiple candidate PUCCH resource combination lists that are indicated for a UE and can support joint transmission to multiple TRPs and multiple panels of a base station.

In some embodiments of the present disclosure, multiple candidate PUCCH resource sets and multiple candidate PUCCH resource combination lists that are indicated for a UE and can support joint transmission to multiple TRPs of a base station can be obtained according to received control signaling. The control signaling carries multiple candidate PUCCH resource sets and multiple candidate PUCCH resource combination lists that are indicated for a UE and can support joint transmission to multiple TRPs of a base station.

In some other embodiments of the present disclosure, multiple candidate PUCCH resource sets and multiple candidate PUCCH resource combination lists that are indicated for a UE and can support joint transmission to multiple panels of a base station can be obtained according to received control signaling. The control signaling carries multiple candidate PUCCH resource sets and multiple candidate PUCCH resource combination lists that are indicated for a UE and can support joint transmission to panels of a base station.

In some embodiments, the aforementioned control signaling can be RRC signaling.

In one embodiment, UE obtains multiple candidate PUCCH resource sets and multiple candidate PUCCH resource combination lists that are indicated for a UE and can support joint transmission to multiple TRPs of a base station according to received RRC signaling. In another embodiment, UE obtains multiple candidate PUCCH resource sets and multiple candidate PUCCH resource combination lists that are indicated for a UE and can support joint transmission to multiple panels of a base station according to received RRC signaling.

The quantity of the aforementioned PUCCH resource sets can be one or more.

Different candidate PUCCH resource combination lists correspond to UCI payloads in different sizes.

Step 602, activating at least one PUCCH resource set in multiple candidate PUCCH resource sets according to received medium access control element (MAC-CE) signaling, taking the activated PUCCH resource set as the target PUCCH resource set, and activating at least one PUCCH resource combination list in multiple candidate PUCCH resource combination lists, and taking the activated PUCCH resource combination list as the target PUCCH resource combination list.

Step 603, determining codepoints for indicating PUCCH resource information according to received DCI signaling.

Step 604, obtaining resource identification information corresponding to the codepoints from the target PUCCH resource combination list.

Step 605, obtaining a target PUCCH resource matched with resource identification information from the target PUCCH resource set.

Step 606, repeatedly transmitting uplink control information (UCI) to multiple TRPs or multiple panels of the base station in one time slot or among multiple time slots by using the target PUCCH resource.

For the implementation of obtaining a target PUCCH resource matched with resource identification information from a target PUCCH resource set in the embodiments corresponding to the aforementioned FIG. 5 and FIG. 6, in different application scenarios, the implementation is different, and examples are as follows:

As an example, a target PUCCH resource matched with resource identification information can be directly obtained from a target PUCCH resource set in response to determining that the quantity of the target PUCCH resource set is one.

The quantity of target PUCCH resources may be one or more.

As an example, PUCCH resource sets to be selected can be determined from multiple target PUCCH sets according to resource identifiers in the case that the quantity of the target PUCCH resource sets is multiple in response to determining that the resource identification information includes the resource identifiers and does not include resource set identifiers; target PUCCH resource matched with the resource identifier is determined from the PUCCH resource sets to be selected.

The determining specific implementation of PUCCH resource set to be selected from multiple target PUCCH resource sets according to resource identifiers can refer to the relevant descriptions in the aforementioned embodiment, and details are not repeated here FIG. 7 is a schematic diagram of another PUCCH resource indication method according to the present disclosure. It should be noted that the PUCCH resource indication method provided by the present disclosure can be executed on a base station.

As shown in FIG. 7, the PUCCH resource indication method provided by the present disclosure can be implemented, and can further be implemented in combination with other methods. Being the same as the previous embodiment, the scheme can be applied in the scenario of joint transmission to multiple TRPs, can further be applied in the scenario of joint transmission to multiple panels, and can further be applied in the scenario of joint transmission in any mode. The method can include:

Step 701, indicating a target PUCCH resource that can support joint transmission to multiple TRPs of a base station for a UE.

In all embodiments of the present disclosure, the method can further be applied to a technical solution of joint transmission to multiple antenna panels. That is to say, step 701 may be: indicating a target PUCCH resource that can support joint transmission to multiple antenna panels of a base station for a UE.

In all embodiments of the present disclosure, the method can further be applied to a technical solution of any joint transmission. That is to say, step 701 may be: indicating a target PUCCH resource that can support joint transmission to a base station for a UE.

In one embodiment of the present disclosure, a control instruction is transmitted to a UE, to indicate a target PUCCH resource that can support joint transmission to multiple TRPs of a base station for the UE The control instruction can carry a target PUCCH resource that is indicated for a UE and can support joint transmission to multiple TRPs of a base station.

In one embodiment of the present disclosure, control instruction is transmitted to a UE, to indicate a target PUCCH resource that can support joint transmission to multiple panels of a base station for the UE. The control instruction can carry a target PUCCH resource that is indicated for a UE and can support joint transmission to base station panels.

In yet another embodiment of the present disclosure, a control instruction is transmitted to a UE, to indicate a target PUCCH resource that can support joint transmission to a base station for the UE The control instruction can carry a target PUCCH resource that is indicated for a UE and can support joint transmission to a base station.

The aforementioned control instruction can be upper layer signaling. In some embodiments, the aforementioned control instruction can be high laser signaling.

As an implementation, RRC signaling can be transmitted to a UE, to indicate a target PUCCH resource that can support joint transmission to multiple TRPs of a base station for the UE through the RRC signaling.

As another implementation, RRC signaling can be transmitted to a UE, to indicate a target PUCCH resource that is can support joint transmission to multiple panels of a base station for the UE through the RRC signaling.

As yet another implementation, RRC signaling can be transmitted to a UE, to indicate a target PUCCH resource that can support joint transmission to a base station for the UE through the RRC signaling.

The quantity of the aforementioned target PUCCH resources can be one or more, which is not specifically limited in this embodiment. In practical applications, the quantity of the target PUCCH resources can be indicated according to actual needs.

In some embodiments, when the quantity of the target PUCCH resource is one, in order to achieve multiple transmissions, the aforementioned target PUCCH resource can correspond to multiple different beams. For example, the aforementioned target PUCCH resource can correspond to two different beams. That is in one embodiment, in order to achieve multiple TRP transmission, the one target PUCCH resource can correspond to multiple different beams. In order to support multiple panel joint transmission, the one target PUCCH resource can correspond to multiple different beams.

In some other embodiments, when the quantity of the target PUCCH resources is multiple, the plurality of target PUCCH resources can correspond to one beam or multiple different beams, which is not specifically limited in the embodiment.

Step 702, receiving UCI transmitted by the UE, wherein UCI is repeatedly transmitted to multiple TRPs of the base station in one time slot or among multiple time slots by using the target PUCCH resource.

In all embodiments of the present disclosure, the scheme can further be applied to joint transmission to multiple antenna panels. That is step 702 is receiving UCI transmitted by a UE, wherein UCI is repeatedly transmitted to multiple panels of a base station in one time slot or among multiple time slots by using a target PUCCH resource.

In all embodiments of the present disclosure, the scheme can further be applied to a transmission scheme of any joint transmission. That is step 702 is receiving UCI transmitted by a UE, wherein UCI is repeatedly transmitted to joint transmission to a base station in one time slot or among multiple time slots by using a target PUCCH resource.

In the PUCCH resource indication method of the embodiment of the present disclosure, the base station indicates a target PUCCH resource that can support joint transmission to multiple TRPs of a base station for a UE, and receives UCI repeatedly transmitted by the UE to the multiple TRPs of the base station in one time slot or among multiple time slots by using the target PUCCH resource. Thus, a base station configures a target PUCCH resource suitable for joint transmission for a UE. Correspondingly, the base station receives the target PUCCH resource for the UE, and repeatedly transmits UCI to the multiple TRPs of the base station in one time slot or among multiple time slots, thereby achieving enhancement of the transmission and feedback of UCI by using the multiple TRPs, and repeatedly transmits UCI by using the PUCCH resource, so that the transmission quality and reliability of the UCI can be improved, thereby satisfying the communication requirement of the ultra-reliable low latency communication service.

As a possible implementation, as shown in FIG. 8, the PUCCH resource indication method provided by the present disclosure can be implemented, and can further be implemented in combination with other methods. Being the same as the previous embodiment, the scheme can be applied in the scenario of joint transmission to multiple TRPs, can further be applied in the scenario of joint transmission to multiple panels, and can further be applied in the scenario of joint transmission in any mode. The method can include:

Step 801, indicating a target PUCCH resource set that can support joint transmission to multiple TRPs of a base station for a UE.

In all embodiments of the present disclosure, the scheme can further be applied to a scenario of joint transmission to multiple antenna panels. That is step 801 is: indicating a target PUCCH resource set that can support joint transmission to multiple panels of a base station for a UE.

In all embodiments of the present disclosure, the scheme can further be applied to scenarios of joint transmission in any modes. That is step 801 is: indicating a target PUCCH resource set that can support joint transmission to a base station for a UE.

In one embodiment of the present disclosure, a base station can transmit a control signaling to a UE, to indicate a target PUCCH resource set that can support joint transmission to multiple TRPs of a base station for the UE. In another embodiment of the present disclosure, a base station can transmit a control signaling to a UE, to indicate a target PUCCH resource set that can support joint transmission to multiple panels of a base station for the UE. In yet another embodiment of the present disclosure, a base station can transmit a control signaling to a UE, to indicate a target PUCCH resource set that can support joint transmission to a base station for the UE.

The aforementioned control signaling can be upper layer signaling.

As an example, the aforementioned upper layer signaling can be RRC signaling.

In one embodiment, a base station can transmit RPC signaling to a UE, wherein the RPC signaling carries a target PUCCH resource set that can support joint transmission to multiple TRPs of a base station for the UE. In another embodiment, a base station can transmit RPC signaling to a UE, wherein the RPC signaling carries a target PUCCH resource set that can support joint transmission to multiple panels of a base station for the UE. In yet another embodiment, a base station can transmit RPC signaling to a UE, wherein the RPC signaling carries a target PUCCH resource set that can support joint transmission to a base station for the UE.

Step 802, transmitting DCI signaling to the UE, wherein DCI signaling is used for indicating the UE to determine a target PUCCH resource from the target PUCCH resource set.

Step 803, receiving UCI transmitted by the UE, wherein UCI is repeatedly transmitted to multiple TRPs of the base station in one time slot or among multiple time slots by using the target PUCCH resource.

In all embodiments of the present disclosure, the scheme can further be applied to joint transmission to multiple antenna panels. That is step 803 is receiving UCI transmitted by a UE, wherein UCI is repeatedly transmitted to multiple panels of a base station in one time slot or among multiple time slots by using a target PUCCH resource.

In all embodiments of the present disclosure, the scheme can further be applied to a transmission scheme of any joint transmission. That is step 803 is receiving UCI transmitted by a UE, wherein UCI is repeatedly transmitted to joint transmission to a base station in one time slot or among multiple time slots by using a target PUCCH resource.

In the embodiment, a base station indicates a target PUCCH resource set that can support joint transmission to multiple TRPs or multiple panels of a base station for a UE, and transmits DCI signaling for the UE, to cause the UE determine a target PUCCH resource from the target PUCCH resource set according to the DCI signaling, receive the target PUCCH resource for the UE, and repeatedly transmit UCI to multiple TRPs or multiple antenna panels of the base station in one time slot or among multiple time slots by using the target PUCCH resource. Thus, a base station configures a target PUCCH resource suitable for joint transmission for a UE. Correspondingly, the base station receives the target PUCCH resource for the UE, and repeatedly transmits UCI to the multiple TRPs or multiple panels of the base station in one time slot or among multiple time slots, thereby achieving enhancement of the transmission and feedback of UCI by using the multiple TRPs or multiple panels, and repeatedly transmits UCI by using the PUCCH resource, so that the transmission quality and reliability of the UCI can be improved, thereby satisfying the communication requirement of the ultra-reliable low latency communication service.

As a possible implementation, as shown in FIG. 9, the PUCCH resource indication method provided by the present disclosure can be implemented, and can further be implemented in combination with other methods. Being the same as the previous embodiment, the scheme can be applied in the scenario of joint transmission to multiple TRPs, can further be applied in the scenario of joint transmission to multiple panels, and can further be applied in the scenario of joint transmission in any mode. The method can include:

Step 901, transmitting RRC signaling to a UE, wherein the RRC signaling carries multiple candidate PUCCH resource sets that are indicated for the UE and can support joint transmission to multiple TRPs of a base station.

In all embodiments of the present disclosure, the scheme can further be applied to joint transmission to multiple antenna panels. That is step 901 may be: transmitting RRC signaling to a UE, wherein the RRC signaling carries multiple candidate PUCCH resource sets that are indicated for a UE and can support joint transmission to multiple panels of a base station.

In all embodiments of the present disclosure, the scheme can further be applied to a transmission scheme of any joint transmission. That is step 901 may be: transmitting RRC signaling to a UE, wherein the RRC signaling carries multiple candidate PUCCH resource sets that are indicated for a UE and can support joint transmission to a base station.

Step 902, transmitting MAC-CE signaling to the UE, wherein the MAC-CE signaling is used for indicating the UE to activate at least one PUCCH resource set in multiple candidate PUCCH resource sets, and taking the activated PUCCH resource set as the target PUCCH resource set.

Step 903, transmitting DCI signaling to the UE, wherein DCI signaling is used for indicating the UE to determine a target PUCCH resource from the target PUCCH resource set.

Step 904, receiving UCI transmitted by the UE, wherein UCI is repeatedly transmitted to multiple TRPs of the base station in one time slot or among multiple time slots by using the target PUCCH resource.

In all embodiments of the present disclosure, the scheme can further be applied to joint transmission to multiple antenna panels. That is step 904 is receiving UCI transmitted by a UE, wherein UCI is repeatedly transmitted to multiple panels of a base station in one time slot or among multiple time slots by using a target PUCCH resource.

In all embodiments of the present disclosure, the scheme can further be applied to a transmission scheme of any joint transmission. That is step 904 is receiving UCI transmitted by a UE, wherein UCI is repeatedly transmitted to joint transmission to a base station in one time slot or among multiple time slots by using a target PUCCH resource.

In the embodiment, a base station achieves the indication to a target PUCCH resource that can support joint transmission to multiple TRPs or multiple panels of a base station for a UE according to RRC signaling, MAC-CE signaling and DCI signaling, and receiving of a target PUCCH resource for the UE, and repeated transmission of UCI to the multiple TRPs or multiple panels of the base station in one time slot or among multiple time slots, thereby achieving enhancement of the transmission and feedback of UCI by using the multiple TRPs or multiple panels, and repeatedly transmits UCI by using the PUCCH resource, so that the transmission quality and reliability of the UCI can be improved, thereby satisfying the communication requirement of the ultra-reliable low latency communication service.

As a possible implementation, as shown in FIG. 10, the PUCCH resource indication method provided by the present disclosure can be implemented, and can further be implemented in combination with other methods. Being the same as the previous embodiment, the scheme can be applied in the scenario of joint transmission to multiple TRPs, can further be applied in the scenario of joint transmission to multiple panels, and can further be applied in the scenario of joint transmission in any mode. The method can include:

Step 1001, indicating a target PUCCH resource set and a target PUCCH resource combination list that can support joint transmission to multiple TRPs of a base station for a UE.

In one embodiment of the present disclosure, a possible implementation of a target PUCCH resource set and a target PUCCH resource combination list that are indicated for a UE and can support joint transmission to multiple TRPs of a base station is as follows: RRC signaling is transmitted to the UE, wherein the RRC signaling carries a target PUCCH resource set and a target PUCCH resource combination list that are indicated for the UE and can support joint transmission to the multiple TRPs of a base station.

In all embodiments of the present disclosure, the scheme can further be applied to a scenario of joint transmission to multiple antenna panels. That is, step 10001 can be: indicating a target PUCCH resource set and a target PUCCH resource combination list that can support joint transmission to multiple panels of a base station to a UE.

In one embodiment of the present disclosure, a possible implementation of a target PUCCH resource set and a target PUCCH resource combination list that are indicated for a UE and can support joint transmission to multiple panels of a base station is as follows: RRC signaling is transmitted to the UE, wherein the RRC signaling carries a target PUCCH resource set and a target PUCCH resource combination list that are indicated for the UE and can support joint transmission to the multiple panels of the base station.

In all embodiments of the present disclosure, in a scenario of joint transmission to a base station. That is, step 1001 can be: indicating a target PUCCH resource set and a target PUCCH resource combination list that can support joint transmission to a base station for a UE.

In one embodiment of the present disclosure, a possible implementation of a target PUCCH resource set and a target PUCCH resource combination list that are indicated for a UE and can support joint transmission to a base station is as follows: RRC signaling is transmitted to the UE, wherein the RRC signaling carries a target PUCCH resource set and a target PUCCH resource combination list that are indicated for the UE and can support joint transmission to a base station.

Step 1002, transmitting DCI signaling to the UE, to cause the UE determine codepoints for indicating PUCCH resource information according to the DCI signing, obtain resource identification information corresponding to the codepoints from the target PUCCH resource combination list, and obtain a target PUCCH resource matched with the resource identification information in the target PUCCH resource set.

Step 1003, receiving UCI transmitted by the UE, wherein UCI is repeatedly transmitted to multiple TRPs of the base station in one time slot or among multiple time slots by using the target PUCCH resource.

In all embodiments of the present disclosure, the scheme can further be applied to joint transmission to multiple antenna panels. That is step 1003 is receiving UCI transmitted by a UE, wherein UCI is repeatedly transmitted to multiple panels of a base station in one time slot or among multiple time slots by using a target PUCCH resource.

In all embodiments of the present disclosure, the scheme can further be applied to a transmission scheme of any joint transmission. That is step 1003 is receiving UCI transmitted by a UE, wherein UCI is repeatedly transmitted to joint transmission to a base station in one time slot or among multiple time slots by using a target PUCCH resource.

In the embodiment, a base station indicates a target PUCCH resource set and a target PUCCH resource combination list that can support joint transmission to multiple TRPs or multiple panels of a base station for a UE, and transmits DCI signaling to the UE, causing the UE determine a target PUCCH resource from the target PUCCH resource set according to DCI signaling, and the base station receives UCI transmitted, by the UE, to multiple TRPs or multiple panels of the base station in one time slot or among multiple time slots by using the target PUCCH resource, thereby achieving enhancement of the transmission and feedback of UCI by using the multiple TRPs or multiple panels, and repeatedly transmits UCI by using the PUCCH resource, so that the transmission quality and reliability of the UCI can be improved, thereby satisfying the communication requirement of the ultra-reliable low latency communication service.

As a possible implementation, as shown in FIG. 11, the PUCCH resource indication method provided by the present disclosure can be implemented, and can further be implemented in combination with other methods. Being the same as the previous embodiment, the scheme can be applied in the scenario of joint transmission to multiple TRPs, can further be applied in the scenario of joint transmission to multiple panels, and can further be applied in the scenario of joint transmission in any mode. The method can include:

Step 1101, transmitting RRC signaling to a UE, wherein the RRC signaling carries multiple candidate PUCCH resource sets and multiple candidate PUCCH resource combination lists that are indicated for the UE and can support joint transmission to multiple TRPs of a base station.

In all embodiments of the present disclosure, the scheme can further be applied to a scenario of joint transmission to multiple antenna panels. That is step 1101 is: transmitting RRC signaling to a UE, wherein the RRC signaling carries multiple candidate PUCCH resource sets and multiple candidate PUCCH resource combination lists that are indicated for a UE and can support joint transmission to multiple panels of a base station.

In all embodiments of the present disclosure, in a scenario of joint transmission to a base station. That is step 1101 is: transmitting RRC signaling to a UE, wherein the RRC signaling carries multiple candidate PUCCH resource sets and multiple candidate PUCCH resource combination lists that are indicated for a UE and can support joint transmission to a base station.

Step 1102, transmitting MAC-CE signaling to the UE.

MAC-CE signaling is used for indicating a UE to activate at least one PUCCH resource set in multiple candidate PUCCH resource sets, take the activated PUCCH resource set as the target PUCCH resource set, and activate at least one PUCCH resource combination list in multiple candidate PUCCH resource combination lists, and take the activated PUCCH resource combination list as the target PUCCH resource combination list.

Step 1103, transmitting DCI signaling to the UE, to cause the UE determine codepoints for indicating PUCCH resource information according to the DCI signing, obtain resource identification information corresponding to the codepoints from the target PUCCH resource combination list, and obtain a target PUCCH resource matched with the resource identification information in the target PUCCH resource set.

Step 1104, receiving UCI transmitted by the UE, wherein UCI is repeatedly transmitted to multiple TRPs of the base station in one time slot or among multiple time slots by using the target PUCCH resource.

In all embodiments of the present disclosure, the scheme can further be applied to joint transmission to multiple antenna panels. That is step 1103 is receiving UCI transmitted by a UE, wherein UCI is repeatedly transmitted to multiple panels of a base station in one time slot or among multiple time slots by using a target PUCCH resource.

In all embodiments of the present disclosure, the scheme can further be applied to a transmission scheme of any joint transmission. That is step 1103 is receiving UCI transmitted by a UE, wherein UCI is repeatedly transmitted to joint transmission to a base station in one time slot or among multiple time slots by using a target PUCCH resource.

In the embodiment, a base station indicates a target PUCCH resource set and a target PUCCH resource combination list where a target PUCCH resource suitable for joint transmission is located for a UE according to RRC signaling and DCI signaling, receives the target PUCCH resource for the UE, and repeated transmits UCI to multiple TRPs or multiple panels of the base station in one time slot or among multiple time slots, thereby achieving enhancement of the transmission and feedback of UCI by using the multiple TRPs or multiple panels, and repeatedly transmits UCI by means of the PUCCH resource, so that the transmission quality and reliability of the UCI can be improved, thereby satisfying the communication requirement of the ultra-reliable low latency communication service.

Figure 13:
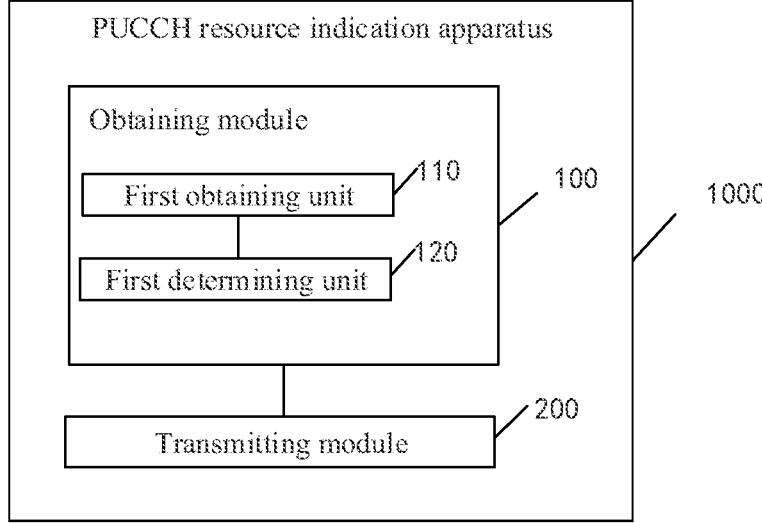
FIG. 13 is a structure diagram of another PUCCH resource indication apparatus according to an embodiment of the present disclosure.
Figure 14:
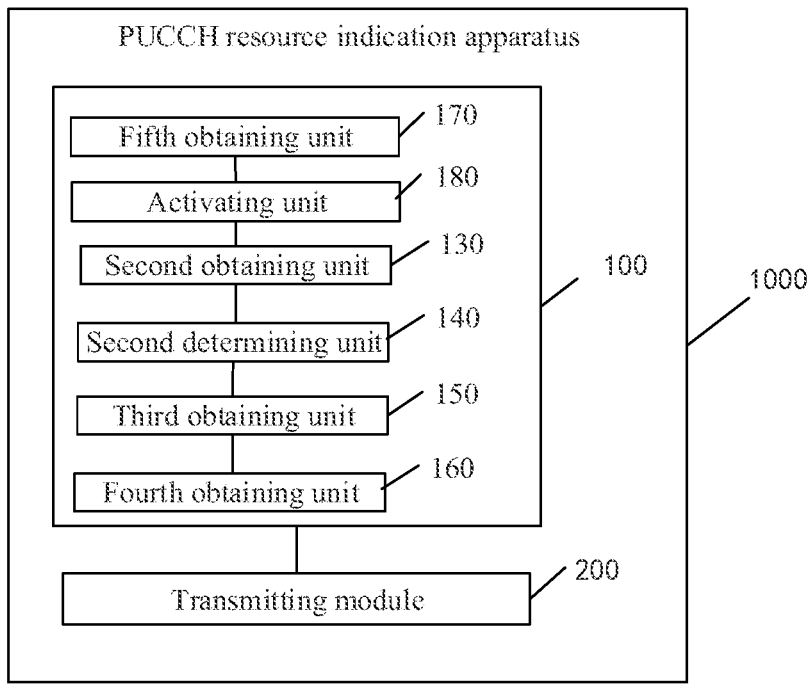
FIG. 14 is a structure diagram of another PUCCH resource indication method apparatus according to an embodiment of the present disclosure.

Corresponding to the PUCCH resource indication method provided in the aforementioned embodiments, the present disclosure further provides a PUCCH resource indication apparatus. As the PUCCH resource indication apparatus provided in the embodiment of the present disclosure corresponds to the PUCCH resource indication method provided in the aforementioned embodiments, the implementation of the PUCCH resource indication method is further applied to the PUCCH resource indication apparatus will not be described in detail in the embodiment. FIGS. 12 to 14 are structure diagrams of the PUCCH resource indication apparatus provided according to the present disclosure.

FIG. 12 is a structure diagram of the PUCCH resource indication apparatus provided by the present disclosure. It should be noted that the apparatus is applied to user equipment (UE).

As shown in FIG. 12, the PUCCH resource indication apparatus 1000 can include an obtaining module 100, and a transmitting module 200, wherein the obtaining module 100 is configured to obtain a target PUCCH resource that is indicated for a UE and can support joint transmission to multiple TRPs of the base station.

In all embodiments of the present disclosure, the scheme can further be applied to a scenario of joint transmission to multiple antenna panels. That is to say, the obtaining module 100 is configured to obtain a target PUCCH resource that is indicated for a UE and can support joint transmission to multiple antenna panels of a base station.

In all embodiments of the present disclosure, in a scenario of any mode of joint transmission to a base station. That is, the obtaining module 100 is configured to obtain a target PUCCH resource that is indicated for a UE and can support joint transmission to a base station.

The transmitting module 200 is configured to repeatedly transmit uplink control information (UCI) to multiple TRPs of the base station in one time slot or among multiple time slots by using the target PUCCH resource.

In all embodiments of the present disclosure, the scheme can further be applied to joint transmission to multiple antenna panels. That is, the transmitting module 200 is configured to repeatedly transmit uplink control information (UCI) to multiple panels of a base station in one time slot or among multiple time slots by using a target PUCCH resource.

In all embodiments of the present disclosure, the scheme can further be applied to a transmission scheme of any joint transmission. That is, the transmitting module 200 is configured to repeatedly transmit uplink control information (UCI) to base station joint transmission in one time slot or among multiple time slots by using a target PUCCH resource.

In one embodiment of the present disclosure, on the basis of the embodiment as shown in FIG. 12, as shown in FIG. 13, the obtaining module 100 can include:

a first obtaining unit 110, which is configured to obtain a target PUCCH resource set that is indicated for a UE and can support joint transmission to multiple TRPs of the base station;

a first determining unit 120, which is configured to determine a target PUCCH resource from the target PUCCH resource set according to received DCI signaling.

In all embodiments of the present disclosure, the scheme can further be applied to joint transmission to multiple antenna panels. That is, the first obtaining unit 110 is configured to obtain a target PUCCH resource set that is indicated for a UE and can support joint transmission to multiple antenna panels of a base station.

In all embodiments of the present disclosure, the scheme can further be applied to transmission schemes of any modes of joint transmission. That is, the first obtaining unit 110 is configured to obtain a target PUCCH resource set that is indicated for a UE and can support joint transmission to a base station;

In the embodiment, a target PUCCH resource that can support joint transmission to multiple TRPs of the base station or multiple panels is obtained, and uplink control information (UCI) is repeatedly transmitted to the multiple TRPs of the base station or multiple panels in one time slot or among multiple time slots by using the target PUCCH resource. Hence, the transmission and feedback of UCI are enhanced by using the multiple TRPs or multiple panels, and the UCI is repeatedly transmitted by using the PUCCH resource, so that the transmission quality and reliability of the UCI can be improved, thereby satisfying the communication requirement of the ultra-reliable low latency communication service.

In one embodiment of the present disclosure, the first obtaining unit 110 is specifically configured to determine multiple candidate PUCCH resource sets that are indicated for that are indicated for a UE and can support joint transmission to the multiple TRPs of a base station according to received RRC signaling, indicate at least one PUCCH resource set in multiple candidate PUCCH resource sets according to received MAC-CE signaling, and take the activated PUCCH resource set as the target PUCCH resource set.

In all embodiments of the present disclosure, the scheme can further be applied to joint transmission to multiple antenna panels. That is, the first obtaining unit 110 is specially configured to determine multiple candidate PUCCH resource sets that are indicated for a UE and can support joint transmission to the multiple panels of a base station according to received RRC signaling, indicate at least one PUCCH resource set in multiple candidate PUCCH resource sets according to received MAC-CE signaling, and take the activated PUCCH resource set as the target PUCCH resource set.

In all embodiments of the present disclosure, the scheme can further be applied to transmission schemes of any modes of joint transmission. That is, the first obtaining unit 110 is specially configured to determine multiple candidate PUCCH resource sets that are indicated for a UE and can support joint transmission to a base station according to received RRC signaling, indicate at least one PUCCH resource set in multiple candidate PUCCH resource sets according to received MAC-CE signaling, and take the activated PUCCH resource set as the target PUCCH resource set.

In one embodiment of the present disclosure, the first obtaining unit 120 is specifically configured to obtain multiple resource identifiers in DCI signaling in response to determining that the quantity of the target PUCCH resource set is one, and the quantity of the target PUCCH resources is multiple, and determine multiple target PUCCH resources from the target PUCCH resource set.

In another embodiment of the present disclosure, the first obtaining unit 120 is further configured to obtain multiple resource identifiers in DCI signaling in response to determining that the quantity of the target PUCCH resource sets is multiple, and the quantity of the target PUCCH resources is multiple, determine target PUCCH resource sets to be selected from the multiple target PUCCH resource sets for each resource identifier, and determine target PUCCH resources matched with the resource identifiers from the target PUCCH resource sets to be selected.

In one embodiment of the present disclosure, the specific implementation for obtaining the multiple resource identifiers in the DCI signaling is: resolving a resource identifier from each resource indication field in the DCI signaling respectively, or; resolving multiple resource identifiers from one resource indication field in the DCI signaling.

In one embodiment of the present disclosure, on the basis of the embodiment of the apparatus as shown in FIG. 12, as shown in FIG. 14, the obtaining module includes:

a second obtaining unit 130, which is configured to obtain a target PUCCH resource set and a target PUCCH resource combination list that are indicated for a UE and can support joint transmission to multiple TRPs of the base station;

a second determining unit 140, which is configured to determine codepoints for indicating PUCCH resource information according to received DCI signaling;

a third obtaining unit 150, which is configured to obtain resource identification information corresponding to the codepoints from the target PUCCH resource combination list;

a fourth obtaining unit 160, which is configured to obtain a target PUCCH resource matched with resource identification information from a target PUCCH resource set.

In all embodiments of the present disclosure, the scheme can further be applied to joint transmission to multiple antenna panels. That is, the second obtaining unit 130 is configured to obtain a target PUCCH resource set and a target PUCCH resource combination list that are indicated for a UE and can support joint transmission to multiple panels of a base station.

In all embodiments of the present disclosure, the scheme can further be applied to transmission schemes of any modes of joint transmission. That is, the second obtaining unit 130 is configured to obtain a target PUCCH resource set and a target PUCCH resource combination list that are indicated for a UE and can support joint transmission to a base station.

In one embodiment of the present disclosure, as shown in FIG. 14, the obtaining module 100 can further include:

a fifth obtaining unit 170, which is configured to obtain multiple candidate PUCCH resource sets and multiple candidate PUCCH resource combination lists that are indicated for a UE and can support joint transmission to multiple TRPs of a base station;

a activating unit 180, which is configured to activate at least one PUCCH resource set in multiple candidate PUCCH resource sets according to received MAC-CE signaling, take the activated PUCCH resource set as the target PUCCH resource set, and activate at least one PUCCH resource combination list in multiple candidate PUCCH resource combination lists, and take the activated PUCCH resource combination list as the target PUCCH resource combination list.

In all embodiments of the present disclosure, the scheme can further be applied to joint transmission to multiple antenna panels. That is, the aforementioned fifth obtaining unit 170 can be configured to obtain multiple candidate PUCCH resource sets and multiple candidate PUCCH resource combination lists that are indicated for a UE and can support joint transmission to multiple panels of a base station.

In all embodiments of the present disclosure, the scheme can further be applied to transmission schemes of any modes of joint transmission. That is, the aforementioned fifth obtaining unit 170 can be configured to obtain multiple candidate PUCCH resource sets and multiple candidate PUCCH resource combination lists that are indicated for a UE and can support joint transmission to a base station.

In one embodiment of the present disclosure, the quantity of target PUCCH resource sets is multiple, and the fourth obtaining unit is specially figured to determine PUCCH resource sets to be selected from multiple target PUCCH resource sets according to resource identifiers in response to determining that the resource identification information includes the resource identifiers and does not include resource set identifiers, and determine target PUCCH resources matched with the resource identifiers from the PUCCH resource sets to be selected.

In one embodiment of the present disclosure, the aforementioned obtaining module 100 is also configured to indicate a target PUCCH resource set and a target PUCCH resource combination list that can support joint transmission to multiple TRPs of the base station for a UE according to received RRC signaling.

In all embodiments of the present disclosure, the scheme can further be applied to joint transmission to multiple antenna panels. That is, the aforementioned obtaining module 100 is also configured to indicate a target PUCCH resource set and a target PUCCH resource combination list that can support joint transmission to multiple panels of a base station for a UE according to received RRC signaling.

In all embodiments of the present disclosure, the scheme can further be applied to a transmission scheme of any joint transmission. That is, the aforementioned obtaining module 100 is also configured to indicate a target PUCCH resource set and a target PUCCH resource combination list that can support joint transmission to a base station for a UE according to received RRC signaling.

For specific description of the PUCCH resource indication apparatus, the description of the embodiments shown in the aforementioned FIG. 1 to FIG. 6 can be referred to, which will not be repeated here.

Figure 15:
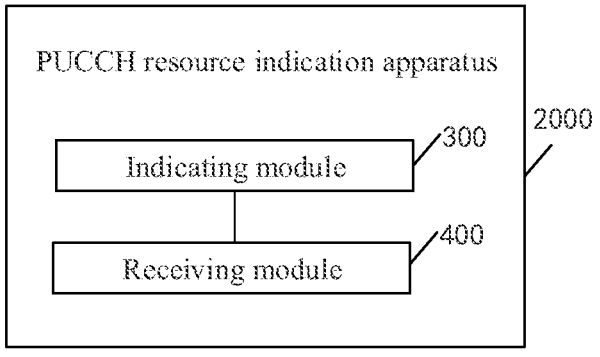
FIG. 15 is a structure diagram of another PUCCH resource indication apparatus according to an embodiment of the present disclosure.

FIG. 15 is a structure diagram of another PUCCH resource indication apparatus provided by the present disclosure. It should be noted that the apparatus is configured in a base station.

As shown in FIG. 15, the PUCCH resource indication apparatus 2000 can include:

an indicating module 300, which is configured to indicate a target PUCCH resource that can support joint transmission to multiple TRPs of a base station for a UE.

a receiving module 400, which is configured to receive UCI transmitted by a UE, wherein UCI is repeatedly transmitted to multiple TRPs of the base station in one time slot or among multiple time slots by using a target PUCCH resource.

In all embodiments of the present disclosure, the scheme can further be applied to joint transmission to multiple antenna panels. That is, the aforementioned indicating module 300 is configured to indicate a target PUCCH resource that can support joint transmission to multiple panels of a base station for a UE.

In all embodiments of the present disclosure, the scheme can further be applied to a transmission scheme of any joint transmission. That is, the aforementioned indicating module 300 is configured to indicate a target PUCCH resource that can support joint transmission to a base station for a UE.

In the embodiment, a target PUCCH resource that can support joint transmission to multiple TRPs of a base station or multiple panels indicated to a UE, and receives UCI repeatedly transmitted by the UE to multiple TRPs of the base station or multiple panels in one time slot or among multiple time slots by using the target PUCCH resource. Thus, a base station configures a target PUCCH resource suitable for joint transmission for a UE. Correspondingly, the base station receives UCI transmitted, by the UE, to multiple TRPs or multiple panels of the base station in one time slot or among multiple time slots by using the target PUCCH resource, thereby achieving enhancement of the transmission and feedback of UCI by using the multiple TRPs or multiple panels, and repeatedly transmits UCI by using the PUCCH resource, so that the transmission quality and reliability of the UCI can be improved, thereby satisfying the communication requirement of the ultra-reliable low latency communication service.

Figure 16:
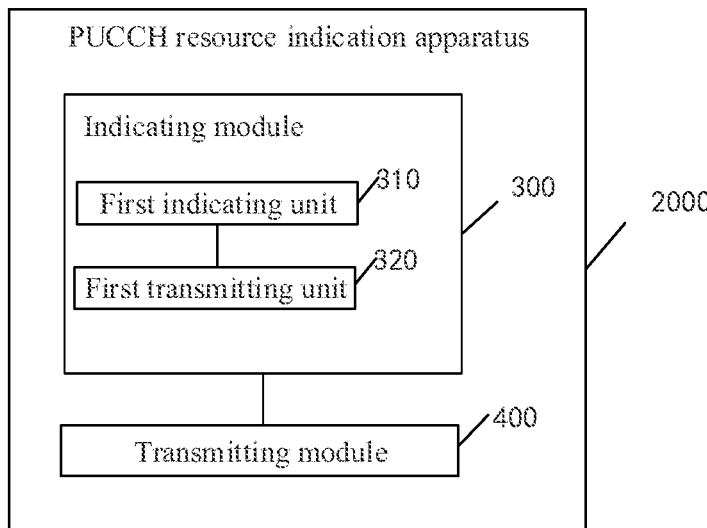
FIG. 16 is a structure diagram of another PUCCH resource indication apparatus according to an embodiment of the present disclosure.

In one embodiment of the present disclosure, on the basis of the embodiment as shown in FIG. 15, as shown in FIG. 16, the aforementioned indicating module 300 can include:

a first indicating unit 310, which is configured to indicate a target PUCCH resource set that is can support joint transmission to multiple TRPs of the base station for a UE;

a first transmitting unit 320, which is configured to transmit DCI signaling to a UE, wherein the DCI signaling is used for indicating the UE to determine a target PUCCH resource from the target PUCCH resource set.

In all embodiments of the present disclosure, the scheme can further be applied to joint transmission to multiple antenna panels. That is, the first indicating unit 310 is configured to indicate a target PUCCH resource set that can support joint transmission to multiple TRPs of the base station for a UE.

In all embodiments of the present disclosure, the scheme can further be applied to a transmission scheme of any joint transmission. That is, the aforementioned first indicating unit 310 is configured to indicate a target PUCCH resource set that can support joint transmission to a base station for a UE.

In one embodiment of the present disclosure, the first indicating unit 310 is specifically configured to transmit RRC signals to an UE, wherein the RRC signaling carries multiple candidate PUCCH resource sets that are indicated for the UE and can support joint transmission to the multiple TRPs of the base station; transmit MAC-CE signaling to the UE, wherein the MAC-CE signaling is used for indicating at least one PUCCH resource set in the multiple candidate PUCCH resource and taking the activated PUCCH resource sets as the target PUCCH resource sets.

In all embodiments of the present disclosure, the scheme can further be applied to joint transmission to multiple antenna panels. That is, the first indicating unit 310 is specially configured to transmit RRC signaling to a UE, wherein the RRC signaling carries multiple candidate PUCCH resource sets that are indicated for the UE and can support joint transmission to the multiple panels of a base station; transmit MAC-CE signaling to the UE, wherein the MAC-CE signaling is used for indicating at least one PUCCH resource set in the multiple candidate PUCCH resource sets and taking the activated PUCCH resource set as a target PUCCH resource set.

In all embodiments of the present disclosure, the scheme can further be applied to a transmission scheme of any joint transmission. That is, the aforementioned first indicating unit 310 is specially configured to transmit RRC signaling to a UE, wherein the RRC signaling carries multiple candidate PUCCH resource sets that are indicated for the UE and can support joint transmission to a base station; transmit MAC-CE signaling to the UE, wherein the MAC-CE signaling is used for indicating at least one PUCCH resource set in the multiple candidate PUCCH resource sets and taking the activated PUCCH resource set as a target PUCCH resource set.

In one embodiment of the present disclosure, on the basis of the embodiment as shown in FIG. 15, as shown in FIG. 16, the aforementioned indicating module 300 can include:

a second indicating unit 330, which is configured to indicate a target PUCCH resource set and a target PUCCH resource combination list that are indicated for a UE and can support joint transmission to multiple TRPs of a base station:

a second transmitting unit 340, which is configured to transmit DCI signaling to a UE, to cause the UE determine codepoints for indicating PUCCH resource information according to the DCI signing, obtain resource identification information corresponding to the codepoints from the target PUCCH resource combination list, and obtain a target PUCCH resource matched with the resource identification information in a target PUCCH resource set.

In all embodiments of the present disclosure, the scheme can further be applied to joint transmission to multiple antenna panels. That is, the aforementioned second indicating unit 330 is configured to indicate a target PUCCH resource set and a target PUCCH resource combination list that can support joint transmission to multiple panels of a base station for an UE.

In all embodiments of the present disclosure, the scheme can further be applied to a transmission scheme of any joint transmission. That is, the aforementioned second indicating unit 330 is configured to indicate a target PUCCH resource set and a target PUCCH resource combination list that can support joint transmission to a base station for an UE.

Figures 17, 18:
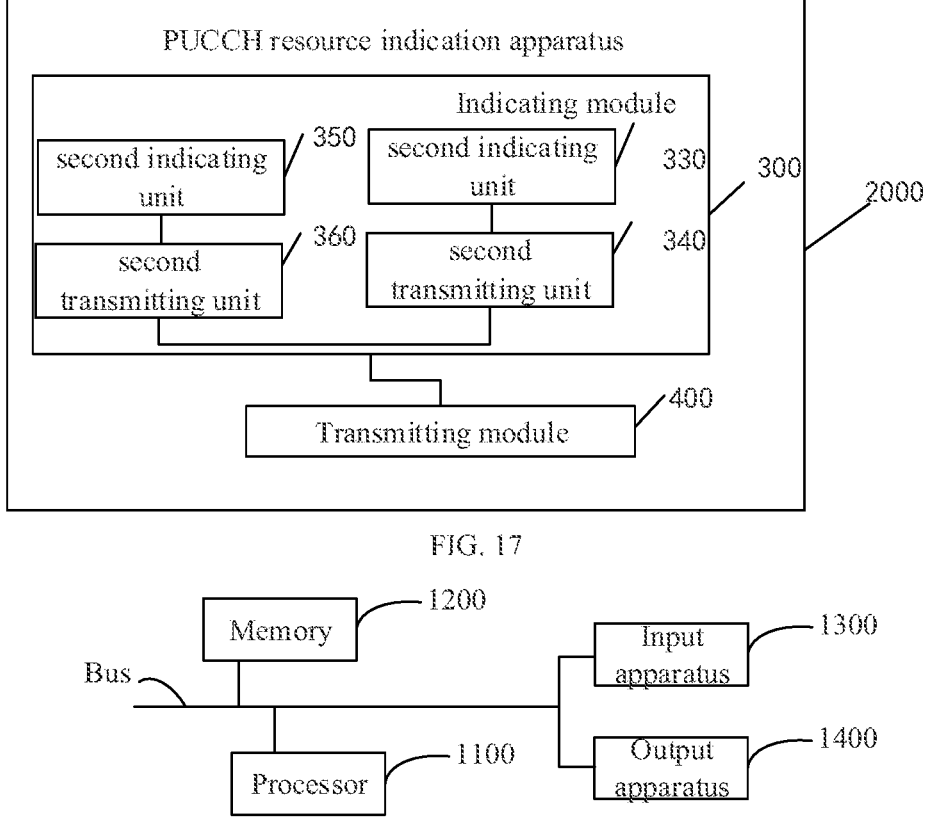
FIG. 17 is a structure diagram of another PUCCH resource indication apparatus according to an embodiment of the present disclosure.
FIG. 18 is a schematic diagram of a communication device according to an embodiment of the present disclosure.

In one embodiment of the present disclosure, as shown in FIG. 17, the aforementioned indicating module 300 can further include:

the third transmitting unit 350 is configured to transmit RRC signaling to a UE, wherein the RRC signaling carries multiple candidate PUCCH resource sets and multiple candidate PUCCH resource combination lists that are indicated for a UE and can support joint transmission to multiple TRPs of the base station.

a fourth transmitting unit, which is configured to transmit MAC-CE to a UE, which is used for activating at least one PUCCH resource set in multiple candidate PUCCH resource sets, taking the activated PUCCH resource set as the target PUCCH resource set, and activating at least one PUCCH resource combination list in multiple candidate PUCCH resource combination lists, and taking the activated PUCCH resource combination list as the target PUCCH resource combination list.

In all embodiments of the present disclosure, the scheme can further be applied to joint transmission to multiple antenna panels. That is, the aforementioned third transmitting unit 350 is configured to transmit RRC signaling to a UE, wherein the RRC signaling carries multiple candidate PUCCH resource sets and multiple candidate PUCCH resource combination lists that are indicated for a UE and can support joint transmission to multiple panels of a base station.

In all embodiments of the present disclosure, the scheme can further be applied to a transmission scheme of any joint transmission. That is, the aforementioned third transmitting unit 350 is configured to transmit RRC signaling to a UE, wherein the RRC signaling carries multiple candidate PUCCH resource sets and multiple candidate PUCCH resource combination lists that are indicated for a UE and can support joint transmission to a base station.

In one embodiment of the present disclosure, the aforementioned indicating module 300 is also configured to transmit RRC signaling to a UE, wherein the RRC signaling carries a target PUCCH resource set and a target PUCCH resource combination list that are indicated for the UE and can support joint transmission to multiple TRPs of the base station.

In all embodiments of the present disclosure, the scheme can further be applied to joint transmission to multiple antenna panels. That is, the aforementioned third indicating module 300 is also configured to transmit RRC signaling to a UE, wherein the RRC signaling carries a target PUCCH resource set and a target PUCCH resource combination list that are indicated for the UE and can support joint transmission to multiple panels of a base station.

In all embodiments of the present disclosure, the scheme can further be applied to a transmission scheme of any joint transmission. That is, the aforementioned third indicating module 300 is also configured to transmit RRC signaling to a UE, wherein the RRC signaling carries a target PUCCH resource set and a target PUCCH resource combination list that are indicated for the UE and can support joint transmission to a base station.

For specific description of the PUCCH resource indication apparatus, relevant descriptions of the embodiments shown in the aforementioned FIG. 7 to FIG. 11 can be referred to, and details are not repeated here.

According to the embodiments of the present invention, the present disclosure further provides a communication device and a readable storage medium.

As shown in FIG. 18, it is a block diagram of a communication device for PUCCH resource indication according to an embodiment of the present disclosure. The communication device is intended to represent digital computers in various forms, such as a laptop computer, a desktop computer, a workbench, a personal digital assistant, a server, a blade server, a mainframe computer, and other suitable computers. The communication device may further represent mobile apparatuses in various forms, such as a personal digital assistant, a cellular phone, a smart phone, a wearable device, and other similar computing apparatuses. The components shown herein, their connections and relationships, and their functions are merely examples, and are not intended to limit the implementation of the present disclosure described and/or required herein.

As shown in FIG. 18, the communication device includes: one or more processors 1100, a memory 1200 and an interface configured to connect various components and including a high-speed interface and a low-speed interface. The various components are interconnected using different buses, and can be mounted on a common motherboard or in other manners if needed. The processor can process instructions executed in the communication device, and includes instructions stored in the memory or on the memory to display graphical information for a GUI on an external input/output apparatus (such as a display device coupled to the interface). In other implementations, a plurality of processors and/or a plurality of buses can be used, as appropriate, along with a plurality of memories and types of memory. Also, multiple communication devices can be connected, with each device providing necessary operations (for example as a server bank, a group of blade servers, or a multi-processor system). In FIG. 18, one processor 1100 is taken as an example.

The memory 1200 is a non-transitory computer readable storage medium provided by the present application. Instructions that can be executed by at least one processor are stored in the memory, so that the at least one processor executes the PUCCH resource indication method provided by the present disclosure. Computer instructions are stored in the non-transitory computer readable storage medium of the present disclosure, and used for enabling a computer to execute the PUCCH resource indication method provided by the present disclosure.

As the non-transitory computer readable storage medium, the memory 1200 can be used to store non-transitory software programs, non-transitory computer executable programs and modules, such as program instructions/modules (for example, the obtaining module 100 and transmitting modules 200 as shown in FIG. 12; for another example, the indicating module 300 and the receiving module 400 as shown in FIG. 15) corresponding to the PUCCH resource indication method in the embodiments of the present disclosure. By running the non-transitory software programs, instructions, and modules stored in the memory 1200, the processor 1100 executes various functional applications and data processing of a server, that is, realizes the PUCCH resource indication method in the aforementioned method embodiments.

The memory 1200 can include a program storage area and a data storage area, where the program storage area can store an operating system and an application program required by at least one function; the data storage area can store data, etc created according to use of a positioning communication device. In addition, the memory 1200 can include a high-speed random access memory, and can further include a non-transitory memory such as at least one disk memory device, a flash memory device or other non-transitory solid stage memories. Optionally, the memory 1200 alternatively includes the memories remotely located from the processor 1100, and these remote memories can be connected to the positioning communication device through a network. An instance of the aforementioned network includes, but is not limited to: the Internet, an intranet, a local-area-network, a mobile communication network or a combination thereof.

The communication device for PUCCH resource indication can further include: an input apparatus 1300 and output apparatus 1400. The processor 1100, the memory 1200, the input apparatus 1300 and the output apparatus 1400 can be connected with each other through buses or other manners. In FIG. 18, bus connection is taken as an example.

The input apparatus 1300 can receive input digital or character information, and generate a key input signal related to a user setting and function control of the positioning communication device; for example, a touch screen, a keypad, a mouse, a trackpad, a touch tablet, an indicating arm, one or more mouse buttons, a trackball, a joy stick or other input apparatuses. The output apparatus 1400 can include a display device, an auxiliary lighting apparatus (for example, LED), a tactile feedback apparatus (for example, a vibration motor) and the like. The display device can include, but is not limited to: a liquid crystal display (LCD), a light emitting diode (LED) display and a plasma display. In some implementation modes, the display device can be a touch screen.

The implementation manners of the systems and technologies described herein may be achieved in a digital electronic circuit system, an integrated circuit system, a dedicated ASIC (application-specific integrated circuit), computer hardware, firmware, software, and/or combinations thereof. The implementation manners may include: being implemented in one or more computer programs, the one or more computer programs may be executed and/or interpreted in a programmable system including at least one programmable processor, and the programmable processor may be a dedicated or general-purpose programmable processor, and may receive data and instructions from a storage system, at least one input apparatus, and at least one output apparatus, and transmit the data and instructions to the storage system, the at least one input apparatus, and the at least one output apparatus.

The computing programs (also known as programs, software, software applications, or codes) include machine instructions of the programmable processor, and may be implemented by virtue of an advanced process and/or an object-oriented programming language, and/or an assembly/machine language. As used therein, the terms 'machine-readable medium' and 'computer-readable medium' refer to any computer program products, devices, and/or apparatuses (such as magnetic disks, optical disks, memories, and programmable logic apparatuses (PLDs)) used for providing the machine instructions and/or data to the programmable processor, and include machine-readable mediums that receive the machine instructions which are taken as machine-readable signals. The term 'machine-readable signal' refers to any signal used for providing the machine instructions and/or data to the programmable processor.

In order to provide interaction with a user, the systems and technologies described herein may be implemented in a computer, the computer is provided with: a display apparatus (such as a CRT (cathode ray tube) or an LCD (liquid crystal display) monitor) used for displaying information to the user; and a keyboard and a pointing apparatus (such as a mouse or a trackball), and the user may provide input to the computer through the keyboard and the pointing apparatus. Other types of apparatuses may also be used for providing interaction with the user; for example, feedback provided to the user may be sensory feedback in any form (such as visual feedback, auditory feedback, or tactile feedback); and the input of the user may be received in any form (including vocal input, speech input, or tactile input).

The systems and technologies described herein may be implemented in a computing system (for example, as a data server) including a background component, or a computing system (for example, an application server) including a middleware component, or a computing system (for example, a user computer with a graphical user interface or a web browser through which the user may interact with the implementation manners of the systems and technologies described herein) including a front-end component, or a computing system including any combination of the background component, the middleware component, or the front-end component. The components of the system may be connected with each other through digital data communication (for example, a communication network) in any form or medium. Examples of the communication network include: a local area network (LAN), a wide area network (WAN), and the Internet.

The computer system may include a client and a server. The client and the server are generally far away from each other and usually interact through the communications network. A relationship between the client and the server is generated by computer programs running in respective computers and having a client-server relationship with each other.

Embodiment 1. A physical uplink control channel (PUCCH) resource indication method, applied to a user equipment (UE), and including:

obtaining a target PUCCH resource that is indicated for the UE and can support joint transmission to multiple transmission reception points (TRPs) of a base station; and repeatedly transmitting uplink control information (UCI) to multiple TRPs of the base station in one time slot or among multiple time slots by using the target PUCCH resource.

Embodiment 2. The physical uplink control channel (PUCCH) resource indication method according to embodiment 1, wherein the obtaining the target PUCCH resource that is indicated for the UE and can support joint transmission to multiple TRPs of the base station comprises:

obtaining a target PUCCH resource set that is indicated for the UE and can support joint transmission to multiple TRPs of the base station; and determining a target PUCCH resource from the target PUCCH resource set according to received DCI signaling.

Embodiment 3. The physical uplink control channel (PUCCH) resource indication method according to embodiment 2, wherein the obtaining the target PUCCH resource set that is indicated for the UE and can support joint transmission to multiple TRPs of the base station includes:

determining multiple candidate PUCCH resource sets that are indicated for the UE and can support joint transmission to multiple TRPs of the base station according to received radio resource control (RRC) signaling; and activating at least one PUCCH resource set in the multiple candidate PUCCH resource sets according to received MAC-CE signaling, and taking the activated PUCCH resource set as the target PUCCH resource set.

Embodiment 4. The physical uplink control channel (PUCCH) resource indication method according to any one of embodiment 2 or 3, wherein the determining the target PUCCH resource from the target PUCCH resource set according to received DCI signaling includes:

in response to determining that the quantity of the target PUCCH resource set is one and the quantity of the target PUCCH resources is multiple, obtaining multiple resource identifiers in the DCI signaling; and determining multiple target PUCCH resources from the target PUCCH resource set according to the multiple resource identifiers.

Embodiment 5. The physical uplink control channel (PUCCH) resource indication method according to embodiment 4, wherein the obtaining multiple resource identifiers in the DCI signaling includes:

resolving a resource identifier from each resource indication field in DCI signaling respectively, or;

resolving multiple resource identifiers from one resource indication field in DCI signaling.

Embodiment 6. The physical uplink control channel (PUCCH) resource indication method according to any one of embodiment 2 or 3, wherein the determining the target PUCCH resource from the target PUCCH resource set according to received DCI signaling includes:

in response to determining that the quantity of the target PUCCH resource set and the quantity of the target PUCCH resources are multiple, obtaining multiple resource identifiers in the DCI signaling;

determining target PUCCH resource sets to be selected from multiple target PUCCH resource sets for each resource identifier; and determining, from the target PUCCH resource sets to be selected, target PUCCH resources matched with resource identifiers.

Embodiment 7. The physical uplink control channel (PUCCH) resource indication method according to embodiment 2, wherein the obtaining the target PUCCH resource that is indicated for the UE and can support joint transmission to multiple TRPs of the base station includes:

obtaining a target PUCCH resource set and a target PUCCH resource combination list that are indicated for the UE and can support joint transmission to multiple TRPs of the base station;

determining codepoints for indicating PUCCH resource information according to received DCI signaling;

obtaining, from the target PUCCH resource combination list, resource identification information corresponding to the codepoints; and obtaining, from the target PUCCH resource set, the target PUCCH resource matched with resource identification information.

Embodiment 8. The physical uplink control channel (PUCCH) resource indication method according to embodiment 7, wherein before the obtaining resource identification information matched with a value in the target PUCCH resource combination list according to received DCI signaling, the method further includes:

obtaining multiple candidate PUCCH resource sets and multiple candidate PUCCH resource combination lists that are indicated for the UE and can support joint transmission to multiple TRPs of the base station; and activating at least one PUCCH resource set in the multiple candidate PUCCH resource sets according to received MAC-CE signaling, taking the activated PUCCH resource set as the target PUCCH resource set, and activating at least one PUCCH resource combination list in the multiple candidate PUCCH resource combination lists, and taking the activated PUCCH resource combination list as the target PUCCH resource combination list.

Embodiment 9. The physical uplink control channel (PUCCH) resource indication method according to any one of embodiment 7 or 8, wherein the quantity of target PUCCH resource sets is multiple, and the obtaining the target PUCCH resource matched with resource identification information from the target PUCCH resource set includes:

in response to determining that the resource identification information includes the resource identifiers and does not include resource set identifiers, determining PUCCH resource sets to be selected from the multiple target PUCCH sets according to resource identifiers; and determining, from PUCCH resource sets to be selected, target PUCCH resources matched with resource identifiers.

Embodiment 10. The physical uplink control channel (PUCCH) resource indication method according to embodiment 7, wherein the obtaining the target PUCCH resource set and the target PUCCH resource combination list that are indicated for the UE and can support joint transmission to multiple TRPs of the base station includes:

indicating a target PUCCH resource set and a target PUCCH resource combination list that can support joint transmission to multiple TRPs of the base station for the UE according to received RRC signaling.

Embodiment 11. A physical uplink control channel (PUCCH) resource indication method, applied to a base station, and including:

indicating a target PUCCH resource that can support joint transmission to multiple multiple transmission reception points (TRPs) of the base station for a UE; and receiving UCI transmitted by the UE, wherein the UCI is repeatedly transmitted to multiple TRPs of the base station in one time slot or among multiple time slots by using the target PUCCH resource.

Embodiment 12. The physical uplink control channel (PUCCH) resource indication method according to embodiment 11, wherein the indicating the target PUCCH resource that can support joint transmission to multiple TRPs of the base station for the UE includes:

indicating a target PUCCH resource set that can support joint transmission to multiple TRPs of the base station for the UE; and transmitting DCI signaling to the UE, wherein the DCI signaling is used for indicating the UE to determine the target PUCCH resource from the target PUCCH resource set.

Embodiment 13. The physical uplink control channel (PUCCH) resource indication method according to embodiment 12, wherein the indicating the target PUCCH resource set that can support joint transmission to multiple TRPs of the base station for the UE includes:

transmitting RRC signaling to the UE, wherein the RRC signaling carries multiple candidate PUCCH resource sets that are indicated for the UE and can support joint transmission to multiple TRPs of the base station; and transmitting MAC-CE signaling to the UE, wherein the MAC-CE signaling is used for indicating the UE to activate at least one PUCCH resource set in the multiple candidate PUCCH resource sets, and taking the activated PUCCH resource set as the target PUCCH resource set.

Embodiment 14. The physical uplink control channel (PUCCH) resource indication method according to embodiment 12, wherein the indicating the target PUCCH resource that can support joint transmission to multiple TRPs of the base station for the UE includes:

indicating a target PUCCH resource set and a target PUCCH resource combination list that can support joint transmission to multiple TRPs of the base station for the UE; and transmitting DCI signaling to the UE, to cause the UE determine codepoints for indicating PUCCH resource information according to the DCI signing, obtain resource identification information corresponding to the codepoints from the target PUCCH resource combination list, and obtain a target PUCCH resource matched with the resource identification information in the target PUCCH resource set.

Embodiment 15. The physical uplink control channel (PUCCH) resource indication method according to embodiment 14, further including:

transmitting RRC signaling to the UE, wherein the RRC signaling carries multiple candidate PUCCH resource sets and multiple candidate PUCCH resource combination lists that are indicated for the UE and can support joint transmission to multiple TRPs of the base station; and transmitting MAC-CE signaling to the UE, wherein the MAC-CE signaling is used for indicate the UE to activate at least one PUCCH resource set in the multiple candidate PUCCH resource sets, take the activated PUCCH resource set as the target PUCCH resource set, and activate at least one PUCCH resource combination list in the multiple candidate PUCCH resource combination lists, and take the activated PUCCH resource combination list as the target PUCCH resource combination list.

Embodiment 16. The physical uplink control channel (PUCCH) resource indication method according to embodiment 15, wherein the indicating the target PUCCH resource set and the target PUCCH resource combination list that and can support joint transmission to multiple TRPs of the base station for the UE includes:

transmitting RRC signaling to the UE, wherein the RRC signaling carries a target PUCCH resource set and a target PUCCH resource combination list that are indicated for the UE and can support joint transmission to multiple TRPs of the base station.

Embodiment 17. A physical uplink control channel (PUCCH) resource indication apparatus, applied to user equipment (UE) and including:

a obtaining module, which is configured to obtain a target PUCCH resource that is indicated for the UE and can support joint transmission to multiple TRPs of the base station; and a transmitting module, which is configured to repeatedly transmit uplink control information (UCI) to multiple TRPs of the base station in one time slot or among multiple time slots by using the target PUCCH resource.

Embodiment 18. The physical uplink control channel (PUCCH) resource indication apparatus, applied to UE and including:

an indicating module, which is configured to indicate a target PUCCH resource that can support joint transmission to multiple TRPs of the base station for the UE; and a receiving module, which is configured to receive UCI transmitted by the UE, wherein the UCI is repeatedly transmitted to multiple TRPs of the base station in one time slot or among multiple time slots by using the target PUCCH resource.

Embodiment 19. A communication device, including:

at least one processor; and a memory communicatively connected to the at least one processor, wherein instructions that can be executed by the at least one processor are stored in the memory, and executed by the at least one processor, causing the at least one processor executes the method according to any one of embodiments 1 to 10.

Embodiment 20. A communication device, including:

at least one processor; and a memory communicatively connected to the at least one processor, wherein instructions that can be executed by at least one processor are stored in the memory, and executed by the at least one processor, causing the at least one processor executes the method according to any one of embodiments 11 to 16.

Embodiment 21. A computer storage medium, storing computer-executable instructions, wherein after the computer-executable instructions are executed by a processor, the method according to any one of embodiments 1 to 10 or 11 to 16 can be implemented.

In an embodiment of the present disclosure, a target PUCCH resource that can support joint transmission to multiple TRPs of the base station is obtained, and uplink control information (UCI) is repeatedly transmitted to the multiple TRPs of the base station, multiple panels or multiple joint transmission in one time slot or among multiple time slots by using the target PUCCH resource. Hence, the transmission and feedback of UCI are enhanced by using the multiple TRPs, and the UCI is repeatedly transmitted by using the PUCCH resource, so that the transmission quality and reliability of the UCI can be improved, thereby satisfying the communication requirement of the ultra-reliable low latency communication service.

It should be understood that the steps may be reordered, added, or deleted by using the flows in various forms, which are shown above. For example, the steps recorded in the present application can be executed in parallel, or in sequence, or in different orders, as long as the expected results of the technical solution provided by the present disclosure can be achieved, which is not limited herein.

The above specific implementation modes do not constitute a limitation on the scope of protection of the present disclosure. Those skilled in the art need to understand that, various modifications, combinations, sub-combinations, and substitutions can be made according to design requirements and other factors. Any modifications, equivalent substitutions, and improvements made within the spirit and principles of the present disclosure should be included within the scope of protection of the present disclosure.

What is claimed is:

1. A physical uplink control channel (PUCCH) resource indication method, performed by user equipment (UE), and comprising:

obtaining a target PUCCH resource that is indicated for the UE and can support joint transmission to multiple transmission reception points (TRPs) of a base station; and repeatedly transmitting uplink control information (UCI) to the multiple TRPs of the base station in one time slot or among multiple time slots by using the target PUCCH resource;

wherein obtaining the target PUCCH resource that is indicated for the UE and can support the joint transmission to the multiple TRPs of the base station comprises:

obtaining a target PUCCH resource set that is indicated for the UE and can support the joint transmission to the multiple TRPs of the base station; and determining the target PUCCH resource from the target PUCCH resource set according to received downlink control information (DCI) signaling; and wherein obtaining the target PUCCH resource that is indicated for the UE and can support the joint transmission to the multiple TRPs of the base station comprises:

obtaining the target PUCCH resource set and a target PUCCH resource combination list that are indicated for the UE and can support the joint transmission to the multiple TRPs of the base station;

determining codepoints for indicating PUCCH resource information according to the received DCI signaling;

obtaining, from the target PUCCH resource combination list, resource identification information corresponding to the codepoints; and obtaining, from the target PUCCH resource set, the target PUCCH resource matched with the resource identification information.

2. The PUCCH resource indication method according to claim 1, wherein obtaining the target PUCCH resource set that is indicated for the UE and can support the joint transmission to the multiple TRPs of the base station comprises:

determining multiple candidate PUCCH resource sets that are indicated for the UE and can support the joint transmission to the multiple TRPs of the base station according to received radio resource control (RRC) signaling; and activating at least one PUCCH resource set in the multiple candidate PUCCH resource sets according to received medium access control control element (MAC-CE) signaling, and taking the activated at least one PUCCH resource set as the target PUCCH resource set.

3. The PUCCH resource indication method according to claim 1, wherein determining the target PUCCH resource from the target PUCCH resource set according to the received DCI signaling comprises:

determining that a quantity of the target PUCCH resource set is one and a quantity of the target PUCCH resources is multiple, obtaining multiple resource identifiers in the received DCI signaling; and determining multiple target PUCCH resources from the target PUCCH resource set according to the multiple resource identifiers.

4. The PUCCH resource indication method according to claim 3, wherein obtaining the multiple resource identifiers in the received DCI signaling comprises:

resolving a resource identifier from each resource indication field in the received DCI signaling respectively, or resolving multiple resource identifiers from one resource indication field in the received DCI signaling.

5. The PUCCH resource indication method according to claim 1, wherein determining the target PUCCH resource from the target PUCCH resource set according to the received DCI signaling comprises:

determining that a quantity of the target PUCCH resource set and a quantity of the target PUCCH resources are multiple, obtaining multiple resource identifiers in the received DCI signaling;

determining target PUCCH resource sets to be selected from the multiple target PUCCH resource sets for each resource identifier; and determining, from the target PUCCH resource sets to be selected, target PUCCH resources matched with the multiple resource identifiers.

6. The PUCCH resource indication method according to claim 1, wherein before obtaining the target PUCCH resource set and the target PUCCH resource combination list that are indicated for the UE and can support the joint transmission to the multiple TRPs of the base station, the method further comprising:

obtaining multiple candidate PUCCH resource sets and multiple candidate PUCCH resource combination lists that are indicated for the UE and can support the joint transmission to the multiple TRPs of the base station; and activating at least one PUCCH resource set in the multiple candidate PUCCH resource sets according to received medium access control control element (MAC-CE) signaling, taking the activated at least one PUCCH resource set as the target PUCCH resource set, and activating at least one PUCCH resource combination list in the multiple candidate PUCCH resource combination lists, and taking the activated at least one PUCCH resource combination list as the target PUCCH resource combination list.

7. The PUCCH resource indication method according to claim 1, wherein a quantity of the target PUCCH resource sets is multiple, and obtaining, from the target PUCCH resource set, the target PUCCH resource matched with the resource identification information comprises:

determining that the resource identification information includes resource identifiers and does not include resource set identifiers, determining PUCCH resource sets to be selected from the multiple target PUCCH resource sets according to the resource identifiers; and determining, from the PUCCH resource sets to be selected, target PUCCH resources matched with the resource identifiers.

8. The PUCCH resource indication method according to claim 1, wherein obtaining the target PUCCH resource set and the target PUCCH resource combination list that are indicated for the UE and can support the joint transmission to the multiple TRPs of the base station comprises:

indicating the target PUCCH resource set and the target PUCCH resource combination list that can support the joint transmission to the multiple TRPs of the base station for the UE according to received radio resource control (RRC) signaling.

9. A physical uplink control channel (PUCCH) resource indication method, performed by a base station, and comprising:

indicating a target PUCCH resource that can support joint transmission to multiple transmission reception points (TRPs) of the base station for user equipment (UE); and receiving uplink control information (UCI) transmitted by the UE, wherein the UCI is repeatedly transmitted to the multiple TRPs of the base station in one time slot or among multiple time slots by using the target PUCCH resource;

wherein indicating the target PUCCH resource that can support the joint transmission to the multiple TRPs of the base station for the UE comprises:

indicating a target PUCCH resource set that can support the joint transmission to the multiple TRPs of the base station for the UE; and transmitting downlink control information (DCI) signaling to the UE, wherein the DCI signaling is used for indicating the UE to determine the target PUCCH resource from the target PUCCH resource set; and wherein indicating the target PUCCH resource that can support the joint transmission to the multiple TRPs of the base station for the UE comprises:

indicating the target PUCCH resource set and a target PUCCH resource combination list that can support the joint transmission to the multiple TRPs of the base station for the UE; and transmitting the DCI signaling to the UE, to cause the UE to: determine codepoints for indicating PUCCH resource information according to the DCI signaling, obtain resource identification information corresponding to the codepoints from the target PUCCH resource combination list, and obtain the target PUCCH resource matched with the resource identification information from the target PUCCH resource set.

10. The PUCCH resource indication method according to claim 9, wherein indicating the target PUCCH resource set that can support the joint transmission to the multiple TRPs of the base station for the UE comprises:

transmitting radio resource control (RRC) signaling to the UE, wherein the RRC signaling carries multiple candidate PUCCH resource sets that are indicated for the UE and can support the joint transmission to the multiple TRPs of the base station; and transmitting medium access control control element (MAC-CE) signaling to the UE, wherein the MAC-CE signaling is used for indicating the UE to activate at least one PUCCH resource set in the multiple candidate PUCCH resource sets, and taking the activated at least one PUCCH resource set as the target PUCCH resource set.

11. The PUCCH resource indication method according to claim 9, further comprising:

transmitting radio resource control (RRC) signaling to the UE, wherein the RRC signaling carries multiple candidate PUCCH resource sets and multiple candidate PUCCH resource combination lists that are indicated for the UE and can support the joint transmission to the multiple TRPs of the base station; and transmitting medium access control control element (MAC-CE) signaling to the UE, wherein the MAC-CE signaling is used for indicating the UE to: activate at least one PUCCH resource set in the multiple candidate PUCCH resource sets, take the activated at least one PUCCH resource set as the target PUCCH resource set, and activate at least one PUCCH resource combination list in the multiple candidate PUCCH resource combination lists, and take the activated at least one PUCCH resource combination list as the target PUCCH resource combination list.

12. The PUCCH resource indication method according to claim 11, wherein indicating the target PUCCH resource set and the target PUCCH resource combination list that can support the joint transmission to the multiple TRPs of the base station for the UE comprises:

transmitting the RRC signaling to the UE, wherein the RRC signaling carries the target PUCCH resource set and the target PUCCH resource combination list that are indicated for the UE and can support the joint transmission to the multiple TRPs of the base station.

13. A communication device, comprising:

at least one processor; and a memory communicatively connected to the at least one processor, wherein instructions that can be executed by the at least one processor are stored in the memory, and the instructions, when executed by the at least one processor, cause the at least one processor to:

obtain a target physical uplink control channel (PUCCH) resource that is indicated for user equipment (UE) and can support joint transmission to multiple transmission reception points (TRPs) of a base station; and repeatedly transmit uplink control information (UCI) to the multiple TRPs of the base station in one time slot or among multiple time slots by using the target PUCCH resource;

wherein the instructions, when executed by the at least one processor, further cause the at least one processor to: when obtaining the target PUCCH resource that is indicated for the UE and can support the joint transmission to the multiple TRPs of the base station, perform:

obtaining a target PUCCH resource set that is indicated for the UE and can support the joint transmission to the multiple TRPs of the base station; and determining the target PUCCH resource from the target PUCCH resource set according to received downlink control information (DCI) signaling; and wherein the instructions, when executed by the at least one processor, further cause the at least one processor to: when obtaining the target PUCCH resource that is indicated for the UE and can support the joint transmission to the multiple TRPs of the base station, perform:

obtaining the target PUCCH resource set and a target PUCCH resource combination list that are indicated for the UE and can support the joint transmission to the multiple TRPs of the base station;

determining codepoints for indicating PUCCH resource information according to the received DCI signaling;

obtaining, from the target PUCCH resource combination list, resource identification information corresponding to the codepoints; and obtaining, from the target PUCCH resource set, the target PUCCH resource matched with the resource identification information.

14. A communication device, comprising:

at least one processor; and a memory communicatively connected to the at least one processor, wherein instructions that can be executed by the at least one processor are stored in the memory, and the instructions, when executed by the at least one processor, cause the at least one processor to perform the PUCCH resource indication method according to claim 9.

15. A non-transitory computer storage medium, storing computer-executable instructions, wherein after the computer-executable instructions are executed by a processor, the PUCCH resource indication method according to claim 1 can be implemented.

16. A non-transitory computer storage medium, storing computer-executable instructions, wherein when the computer-executable instructions are executed by a processor, the processor is configured to perform the PUCCH resource indication method according to claim 9.

* * * * *